United States Patent
Wei

(10) Patent No.: US 8,209,415 B2
(45) Date of Patent: Jun. 26, 2012

(54) SYSTEM AND METHOD FOR COMPUTER CLOUD MANAGEMENT

(75) Inventor: Coach Wei, Cambridge, MA (US)

(73) Assignee: Yottaa Inc, Boston, MA (US)

( * ) Notice: Subject to any disclaimer, the term of this patent is extended or adjusted under 35 U.S.C. 154(b) by 177 days.

(21) Appl. No.: 12/714,486

(22) Filed: Feb. 27, 2010

(65) Prior Publication Data

US 2010/0223378 A1 Sep. 2, 2010

Related U.S. Application Data

(60) Provisional application No. 61/156,069, filed on Feb. 27, 2009, provisional application No. 61/165,250, filed on Mar. 31, 2009.

(51) Int. Cl.
*G06F 15/16* (2006.01)
(52) U.S. Cl. ........................ 709/224; 709/242
(58) Field of Classification Search .......... 709/200–203, 709/217–227, 242
See application file for complete search history.

(56) References Cited

U.S. PATENT DOCUMENTS

| | | | |
|---|---|---|---|
| 4,345,116 A | 8/1982 | Ash et al. | |
| 5,852,717 A | 12/1998 | Bhide et al. | |
| 6,061,349 A | 5/2000 | Colie et al. | |
| 6,108,703 A | 8/2000 | Leighton et al. | |
| 6,226,684 B1 | 5/2001 | Sung et al. | |
| 6,275,470 B1 | 8/2001 | Ricciulli | |
| 6,415,323 B1 | 7/2002 | McCanne et al. | |
| 6,415,329 B1 | 7/2002 | Gelman et al. | |
| 6,430,618 B1 | 8/2002 | Karger et al. | |
| 6,449,658 B1 | 9/2002 | Lafe et al. | |
| 6,606,685 B2 | 8/2003 | Huxoll | |
| 6,650,621 B1 | 11/2003 | Maki-Kullas | |
| 6,754,699 B2 | 6/2004 | Swildens et al. | |
| 6,795,823 B1 | 9/2004 | Aklepi et al. | |
| 6,820,133 B1 | 11/2004 | Grove et al. | |
| 6,880,002 B2 | 4/2005 | Hirschfeld et al. | |
| 6,963,915 B2 | 11/2005 | Karger et al. | |
| 7,020,719 B1 | 3/2006 | Grove et al. | |
| 7,032,010 B1 | 4/2006 | Swildens et al. | |
| 7,050,963 B2 * | 5/2006 | Flavin | 703/27 |
| 7,072,979 B1 | 7/2006 | Aviani et al. | |

(Continued)

OTHER PUBLICATIONS

J. Varia, Cloud Architectures, Amazon Web Services Blog. Jul. 16, 2008 (http://aws.typepad.com/aws/2008/07/white-paper-on.html) See p. 3-p. 5; figures 2 and 4.

(Continued)

*Primary Examiner* — Moustafa M Meky
(74) *Attorney, Agent, or Firm* — AKC Patents LLC; Aliki K. Collins

(57) ABSTRACT

A method for auto-scaling the infrastructure capacity of an application in response to client demands includes providing an application configured to run on an application infrastructure comprising a plurality of server nodes and to be accessed by clients via a first network. Next, providing traffic management means directing traffic from the clients to the server nodes of the application infrastructure. Providing monitoring means gathering performance metrics of the application and metrics of the application infrastructure. Providing controlling means configured to change the application infrastructure. Next, monitoring the performance metrics of the application and the metrics of the application infrastructure via the monitoring means thereby obtaining metrics information and then changing the application infrastructure based on the metrics information via the controlling means. Finally directing network traffic targeted to access the application to server nodes of the changed application infrastructure via the traffic management means.

43 Claims, 22 Drawing Sheets

U.S. PATENT DOCUMENTS

| | | | |
|---|---|---|---|
| 7,086,061 B1 * | 8/2006 | Joshi et al. | 718/105 |
| 7,111,061 B2 | 9/2006 | Leighton et al. | |
| 7,126,955 B2 | 10/2006 | Nabhan et al. | |
| 7,155,515 B1 | 12/2006 | Brown et al. | |
| 7,165,116 B2 | 1/2007 | Grove et al. | |
| 7,203,796 B1 | 4/2007 | Muppalaneni et al. | |
| 7,251,688 B2 | 7/2007 | Leighton et al. | |
| 7,257,584 B2 | 8/2007 | Hirschfeld et al. | |
| 7,266,656 B2 | 9/2007 | Chen et al. | |
| 7,274,658 B2 | 9/2007 | Bornstein et al. | |
| 7,286,476 B2 | 10/2007 | Helmy et al. | |
| 7,308,499 B2 | 12/2007 | Chavez et al. | |
| 7,325,109 B1 | 1/2008 | Muppalaneni et al. | |
| 7,340,532 B2 | 3/2008 | Swildens | |
| 7,346,676 B1 | 3/2008 | Swildens et al. | |
| 7,346,695 B1 | 3/2008 | Masters et al. | |
| 7,359,985 B2 | 4/2008 | Grove et al. | |
| 7,373,644 B2 | 5/2008 | Aborn | |
| 7,376,736 B2 | 5/2008 | Sundaram et al. | |
| 7,380,039 B2 | 5/2008 | Miloushev et al. | |
| 7,389,510 B2 | 6/2008 | Forrester | |
| 7,392,314 B2 * | 6/2008 | Betzler et al. | 709/226 |
| 7,392,325 B2 | 6/2008 | Grove et al. | |
| 7,395,335 B2 | 7/2008 | Brown et al. | |
| 7,395,349 B1 | 7/2008 | Szabo et al. | |
| 7,398,422 B2 | 7/2008 | Amano et al. | |
| 7,406,692 B2 | 7/2008 | Halpern et al. | |
| 7,418,518 B2 | 8/2008 | Grove et al. | |
| 7,426,617 B2 | 9/2008 | Stager et al. | |
| 7,436,775 B2 | 10/2008 | Jordan et al. | |
| 7,447,774 B2 | 11/2008 | Viswanath et al. | |
| 7,447,939 B1 | 11/2008 | Faulkner et al. | |
| 7,451,345 B2 | 11/2008 | Butterworth et al. | |
| 7,454,458 B2 | 11/2008 | Islam et al. | |
| 7,454,500 B1 | 11/2008 | Hsu et al. | |
| 7,475,157 B1 | 1/2009 | Tormasov et al. | |
| 7,478,148 B2 | 1/2009 | Neerdaels | |
| 7,480,705 B2 | 1/2009 | DeLima et al. | |
| 7,480,711 B2 | 1/2009 | Lownsbrough et al. | |
| 7,484,002 B2 | 1/2009 | Swildens et al. | |
| 7,490,103 B2 | 2/2009 | Stager et al. | |
| 7,502,858 B2 | 3/2009 | Gupta et al. | |
| 7,607,129 B2 * | 10/2009 | Rosu et al. | 718/1 |
| 7,653,700 B1 * | 1/2010 | Bahl et al. | 709/217 |
| 7,676,576 B1 * | 3/2010 | Kommula | 709/226 |
| 2001/0052016 A1 | 12/2001 | Skene et al. | |
| 2002/0163882 A1 | 11/2002 | Bornstein et al. | |
| 2003/0210694 A1 | 11/2003 | Jayaraman et al. | |
| 2006/0031266 A1 | 2/2006 | Colbeck et al. | |
| 2006/0085792 A1 | 4/2006 | Traut | |
| 2006/0136908 A1 | 6/2006 | Bebhart et al. | |
| 2006/0193247 A1 | 8/2006 | Naseh et al. | |
| 2007/0078988 A1 | 4/2007 | Miloushev et al. | |
| 2007/0130324 A1 * | 6/2007 | Wang | 709/224 |
| 2008/0016387 A1 | 1/2008 | Bensinger | |
| 2008/0052404 A1 | 2/2008 | Leighton et al. | |
| 2008/0151766 A1 | 6/2008 | Khasnabish et al. | |
| 2008/0159159 A1 | 7/2008 | Weinman | |
| 2008/0201720 A1 * | 8/2008 | Betzler et al. | 718/105 |
| 2008/0256223 A1 | 10/2008 | Chan et al. | |
| 2008/0281908 A1 | 11/2008 | McCanne et al. | |
| 2008/0320482 A1 | 12/2008 | Dawson et al. | |
| 2009/0030986 A1 | 1/2009 | Bates | |
| 2009/0055507 A1 | 2/2009 | Oeda | |
| 2009/0180480 A1 | 7/2009 | Hilt et al. | |
| 2010/0058342 A1 * | 3/2010 | Machida | 718/1 |
| 2010/0131324 A1 | 5/2010 | Ferris | |
| 2010/0169477 A1 * | 7/2010 | Stienhans et al. | 709/224 |
| 2010/0223621 A1 * | 9/2010 | Joshi et al. | 718/105 |

OTHER PUBLICATIONS

F.A. Samimi, et al., Self-Managed Networks, Systems and Services. Dec. 31, 2006 Lecture Notes in Computer Science, vol. 3996/2006, 130-141 (Mobile Service Clouds: A Self-managing Infrastructure for Autonomic Mobile Computing Services) See section 3.

* cited by examiner

SYSTEM AND METHOD FOR COMPUTER CLOUD MANAGEMENT

CROSS REFERENCE TO RELATED CO-PENDING APPLICATIONS

This application claims the benefit of U.S. provisional application Ser. No. 61/156,069 filed on Feb. 27, 2009 and entitled METHOD AND SYSTEM FOR COMPUTER CLOUD MANAGEMENT, which is commonly assigned and the contents of which are expressly incorporated herein by reference.

This application claims the benefit of U.S. provisional application Ser. No. 61/165,250 filed on Mar. 31, 2009 and entitled CLOUD ROUTING NETWORK FOR BETTER INTERNET PERFORMANCE, RELIABILITY AND SECURITY, which is commonly assigned and the contents of which are expressly incorporated herein by reference.

FIELD OF THE INVENTION

The present invention relates to a system and a method for computer cloud management and in particular, to utilizing a computer cloud network for accelerating and auto-scaling an application in response to load demand changes.

BACKGROUND OF THE INVENTION

The advancement of computer networking has enabled computer programs to evolve from the early days' monolithic form that is used by one user at a time into distributed applications. A distributed application, running on two or more networked computers, is able to support multiple users at the same time. FIG. 1 shows the basic structure of a distributed application in a client-server architecture. The clients 100 send requests 110 via the network 140 to the server 150, and the server 150 sends responses 120 back to the clients 100 via the network 140. The same server is able to serve multiple concurrent clients.

Today, most applications are distributed. FIG. 2 shows the architecture of a typical web application. The client part of a web application runs inside a web browser 210 that interacts with the user. The server part of a web application runs on one or multiple computers, such as Web Server 250, Application Server 260, and Database Server 280. The server components typically reside in an infrastructure referred to as "host infrastructure" or "application infrastructure" 245.

In order for a web application to be able to serve a large number of clients, its host infrastructure must meet performance, scalability and availability requirements. "Performance" refers to the application's responsiveness to user interactions. "Scalability" refers to an application's capability to perform under increased load demand. "Availability" refers to an application's capability to deliver continuous, uninterrupted service. With the exponential growth of the number of Internet users, access demand can easily overwhelm the capacity of a single server computer.

An effective way to address performance, scalability and availability concerns is to host a web application on multiple servers (server clustering) and load balance client requests among these servers (or sites). Load balancing spreads the load among multiple servers. If one server failed, the load balancing mechanism would direct traffic away from the failed server so that the site is still operational. FIG. 3 is an illustration of using multiple web servers, multiple application servers and multiple database servers to increase the capacity of the web application. Clustering is frequently used today for improving application scalability.

Another way for addressing performance, scalability and availability concerns is to replicate the entire application to two different data centers (site mirroring). Site mirroring is a more advanced approach than server clustering because it replicates an entire application, including documents, code, data, web server software, application server software, database server software, to another geographic location, thereby creating two geographically separated sites mirroring each other. A hardware device called "Global Load Balancing Device" performs load balancing among the multiple sites.

For both server clustering and site mirroring, a variety of load balancing mechanisms have been developed. They all work fine in their specific context.

However, both server clustering and site mirroring have significant limitations. Both approaches provision a "fixed" amount of infrastructure capacity, while the load on a web application is not fixed. In reality, there is no "right" amount of infrastructure capacity to provision for a web application because the load on the application can swing from zero to millions of hits within a short period of time when there is a traffic spike. When under-provisioned, the application may perform poorly or even become unavailable. When over-provisioned, the over-provisioned capacity is wasted. To be conservative, a lot of web operators end up purchasing significantly more capacity than needed. It is common to see server utilization below 20% in a lot of data centers today, resulting in substantial capacity waste. Yet the application still goes under when traffic spikes happen. This is called as a "capacity dilemma" that happens every day. Furthermore, these traditional techniques are time consuming and expensive to set up and are equally time consuming and expensive to make changes. Events like natural disaster can cause an entire site to fail. Comparing to server clustering, site mirroring provides availability even if one site completely failed. However, it is more complex to set up and requires data synchronization between the two sites. Lastly, the set of global load balancing devices is a single point of failure.

A third approach for improving web performance is to use a Content Delivery Network (CDN) service. Companies like Akamai and Limelight Networks operate a global content delivery infrastructure comprising of tens of thousands of servers strategically placed across the globe. These servers cache web content (static documents) produced by their customers (content providers). When a user requests such content, a routing mechanism (typically based on Domain Name Server (DNS) techniques) would find an appropriate caching server to serve the request. By using content delivery service, users receive better content performance because content is delivered from an edge server that is closer to the user.

Though content delivery networks can enhance performance and scalability, they are limited to static content. Web applications are dynamic. Responses dynamically generated from web applications can not be cached. Web application scalability is still limited by its hosting infrastructure capacity. Further, CDN services do not enhance availability for web applications in general. If the hosting infrastructure goes down, the application will not be available. So though CDN services help improve performance and scalability in serving static content, they do not change the fact that the site's scalability and availability are limited by the site's infrastructure capacity.

Over the recent years, cloud computing has emerged as an efficient and more flexible way to do computing, shown in FIG. 4. According to Wikipedia, cloud computing "refers to the use of Internet-based (i.e. Cloud) computer technology for a variety of services. It is a style of computing in which dynamically scalable and often virtualized resources are provided as a service over the Internet. Users need not have knowledge of, expertise in, or control over the technology infrastructure 'in the cloud' that supports them". The word "cloud" is a metaphor, based on how it is depicted in computer network diagrams, and is an abstraction for the complex infrastructure it conceals. In this document, we use the term "Cloud Computing" to refer to the utilization of a network-based computing infrastructure that includes many inter-connected computing nodes to provide a certain type of service, of which each node may employ technologies like virtualization and web services. The internal works of the cloud itself are concealed from the user point of view.

One of the enablers for cloud computing is virtualization. Wikipedia explains that "virtualization is a broad term that refers to the abstraction of computer resource". It includes "Platform virtualization, which separates an operating system from the underlying platform resources", "Resource virtualization, the virtualization of specific system resources, such as storage volumes, name spaces, and network resource" and so on. VMWare is a highly successful company that provides virtualization software to "virtualize" computer operating systems from the underlying hardware resources. Due to virtualization, one can use software to start, stop and manage "virtual machine" (VM) nodes 460, 470 in a computing environment 450, shown in FIG. 4. Each "virtual machine" behaves just like a regular computer from an external point of view. One can install software onto it, delete files from it and run programs on it, though the "virtual machine" itself is just a software program running on a "real" computer.

Another enabler for cloud computing is the availability of commodity hardware as well as the computing power of commodity hardware. For a few hundred dollars, one can acquire a computer that is more powerful than a machine that would have cost ten times more twenty years ago. Though an individual commodity machine itself may not be reliable, putting many of them together can produce an extremely reliable and powerful system. Amazon.com's Elastic Computing Cloud (EC2) is an example of a cloud computing environment that employs thousands of commodity machines with virtualization software to form an extremely powerful computing infrastructure.

By utilizing commodity hardware and virtualization, cloud computing can increase data center efficiency, enhance operational flexibility and reduce costs. Running a web application in a cloud environment has the potential to efficiently meet performance, scalability and availability objectives. For example, when there is a traffic increase that exceeded the current capacity, one can launch new server nodes to handle the increased traffic. If the current capacity exceeds the traffic demand by a certain threshold, one can shut down some of the server nodes to lower resource consumption. If some existing server nodes failed, one can launch new nodes and redirect traffic to the new nodes.

However, running web applications in a cloud computing environment like Amazon EC2 creates new requirements for traffic management and load balancing because of the frequent node stopping and starting. In the cases of server clustering and site mirroring, stopping a server or server failure are exceptions. The corresponding load balancing mechanisms are also designed to handle such occurrences as exceptions. In a cloud computing environment, server reboot and server shutdown are assumed to be common occurrences rather than exceptions. On one side, the assumption that individual nodes are not reliable is at the center of design for a cloud system due to its utilization of commodity hardware. On the other side, there are business reasons to start or stop nodes in order to increase resource utilization and reduce costs. Naturally, the traffic management and load balancing system required for a cloud computing environment must be responsive to node status changes.

Thus it would be advantageous to provide a cloud management system that can automatically scale up and scale down infrastructure capacity in response to an application's load demand, intelligently direct traffic to a plurality of server nodes in response to node status changes and load condition changes, while enhancing an application's performance, scalability and availability.

SUMMARY OF THE INVENTION

The invention provides a cloud management system that provides dynamic content acceleration, traffic management and auto-scaling for applications. The system directs clients to appropriate server nodes among a plurality of geographically distributed nodes so that performance is optimal according to a certain metrics. The system also monitors the load condition and performance of the application, and dynamically adjusts the application's infrastructure capacity to match the demand according to a certain policy. For example, when it detects a traffic increase that may overwhelm the current capacity, the system automatically launches new server instances and spreads load to these new instances. Further, the system manages traffic and performs load balancing among a plurality of server nodes that the application is running on.

In general, in one aspect, the invention features a method for auto-scaling the infrastructure capacity of an application in response to client demands. The method includes providing an application configured to run on an application infrastructure comprising a plurality of server nodes and to be accessed by clients via a first network. Next, providing traffic management means directing traffic from the clients to the server nodes of the application infrastructure. Providing monitoring means gathering performance metrics of the application and metrics of the application infrastructure. Providing controlling means configured to change the application infrastructure. Next, monitoring the performance metrics of the application and the metrics of the application infrastructure via the monitoring means thereby obtaining metrics information and then changing the application infrastructure based on the metrics information via the controlling means. Finally directing network traffic targeted to access the application to server nodes of the changed application infrastructure via the traffic management means.

Implementations of this aspect of the invention may include one or more of the following. The application infrastructure comprises a cloud computing environment. The application infrastructure comprises virtual machines. The application infrastructure comprises virtual machines and physical server machines. The application infrastructure comprises server nodes running in different geographic locations. The controlling means comprise means for starting, means for stopping and means for managing virtual machine instances. The metrics information comprises geographic proximity of the clients to the server nodes of the application infrastructure. The metrics information comprises application load demand. The metrics information comprises application performance data. The traffic management means comprises means for resolving a domain name of the application via a Domain Name Server (DNS). The traffic management means performs traffic management by providing Internet Protocol (IP) addresses of the server nodes in the application infrastructure to the clients. The traffic management means performs load balancing among the server nodes in the application infrastructure. The traffic management means selects one or more optimal server nodes among the server nodes in the application infrastructure for serving client requests. The traffic management means selects one or more server nodes among the server nodes in the application infrastructure based on geographic proximity of the server nodes to the clients. The traffic management means selects one or more server nodes among the server nodes in the application infrastructure based on optimized network performance to certain clients. The traffic management means selects a persistent server node among the server nodes in the application infrastructure for serving requests from the same client. The controlling means change the application infrastructure capacity in response to the metrics information. The controlling means change the application infrastructure capacity in response to a certain policy. The controlling means change the application infrastructure capacity in response to instructions received from a third party. The controlling means change the application infrastructure capacity by launching new server nodes in the application infrastructure. The controlling means change the application infrastructure capacity by shutting down sever nodes in the application infrastructure.

In general, in another aspect, the invention features a system for auto-scaling the infrastructure capacity of an application in response to client demands. The system includes an application configured to run on an application infrastructure comprising a plurality of server nodes and to be accessed by clients via a first network. The system also includes traffic management means directing traffic from the clients to the server nodes of the application infrastructure, monitoring means gathering performance metrics of the application and metrics of the application infrastructure and controlling means configured to change the application infrastructure. The monitoring means monitor the performance metrics of the application and the metrics of the application infrastructure and thereby obtain metrics information. The controlling means change the application infrastructure based on the metrics information and the traffic management means direct network traffic targeted to access the application to server nodes of the changed application infrastructure.

Among the advantages of the invention may be one or more of the following. The system is horizontally scalable. Its capacity increases linearly by just adding more computing nodes to the system. It is also fault-tolerant. Failure of individual components within the system does not cause system failure. In fact, the system assumes component failures as common occurrences and is able to run on commodity hardware to deliver high performance and high availability services.

Applications of the present invention include but are not limited to the followings. Accelerating and load balancing requests among node instances running at multiple sites (data centers), as shown in FIG. 7. Scaling and load balancing a web application in a cloud environment, as shown in FIG. 8. Scaling and load balancing an email application in a cloud environment, as shown in FIG. 9. The traffic processing units provide performance acceleration, load balancing and failover. The management means manage server nodes in response to load demand and performance changes, such as starting new nodes, shutting down existing nodes and recover from failed nodes, among others. The monitoring means monitor server nodes and collect performance metrics data;

The traffic processing unit uses a Domain Name System (DNS) to provide Internet Protocol (IP) addresses for the "optimal" server node in a DNS hostname query. Such a technique can be used in any situation where the client requires access to a replicated network resource. It directs the client request to an appropriate replica so that the route to the replica is good from a performance standpoint. Further, the traffic processing unit also takes session stickiness into consideration that requests from the same client session is routed to the same server node persistently when session stickiness is required. Session stickiness, also known as "IP address persistence" or "server affinity" in the art, means that different requests from the same client session will always to be routed to the same server in a multi-server environment. "Session stickiness" is required for a variety of web applications to function correctly.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

Figure 1:
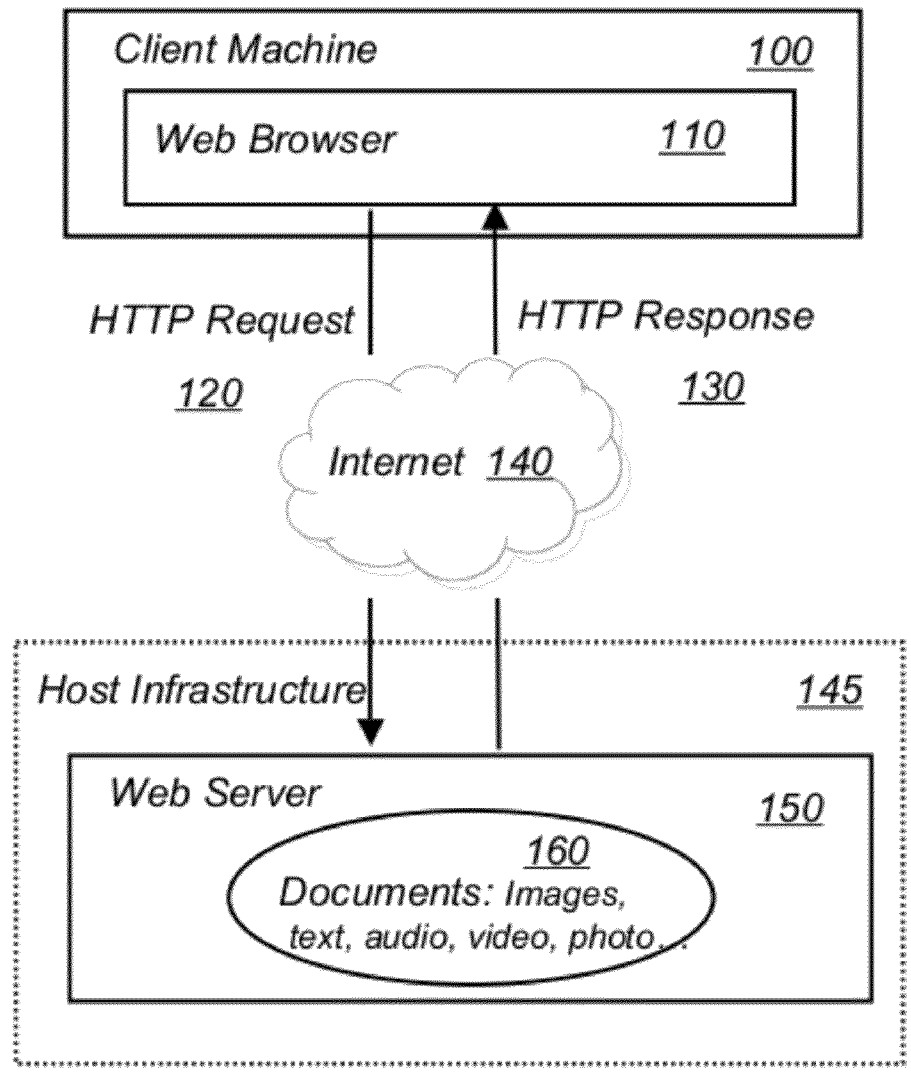
FIG. 1 is block diagram of a distributed application in a client-server architecture (static web site)
Figure 2:
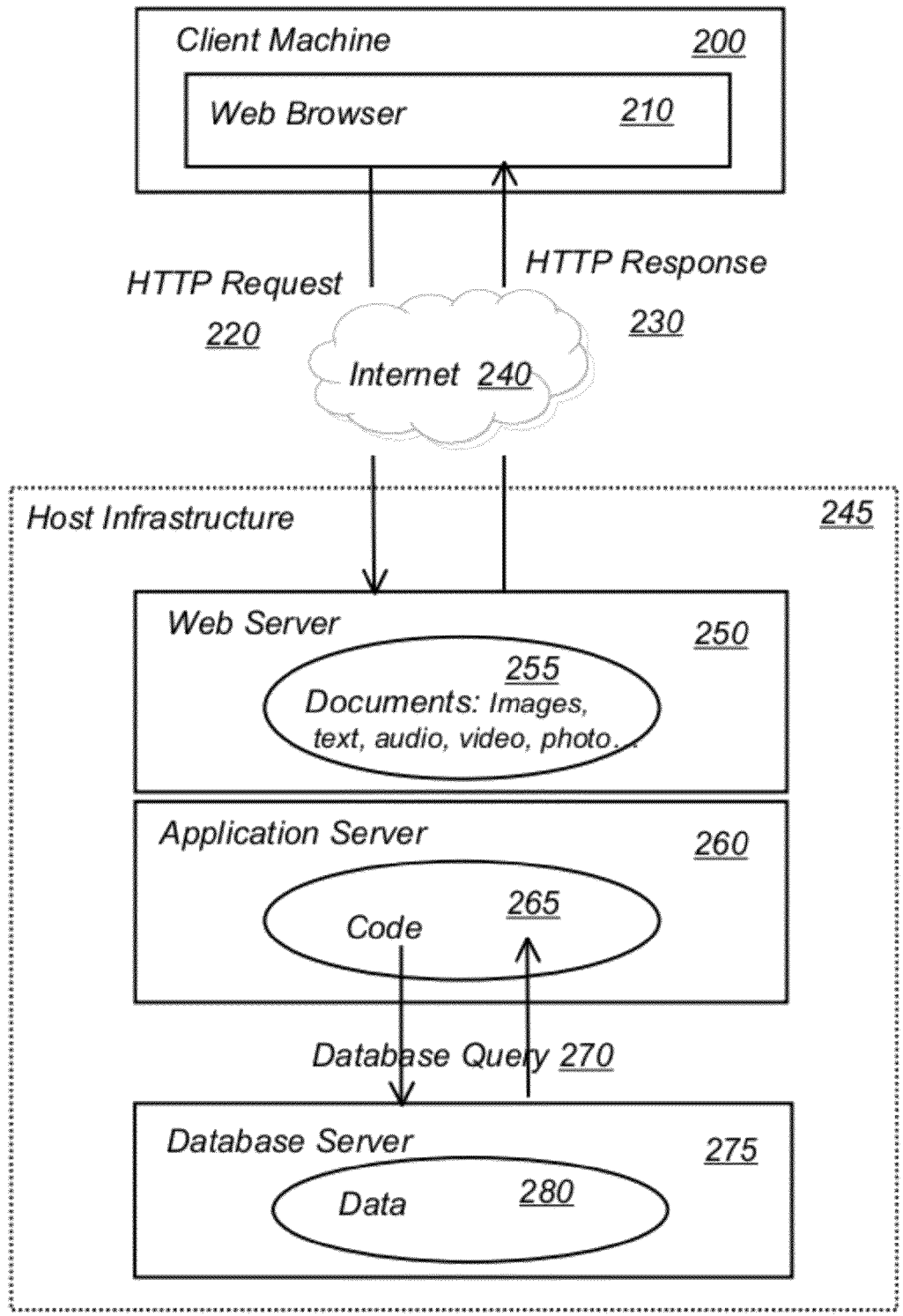
FIG. 2 is block diagram of a typical web application ("dynamic web site")
Figure 3A:
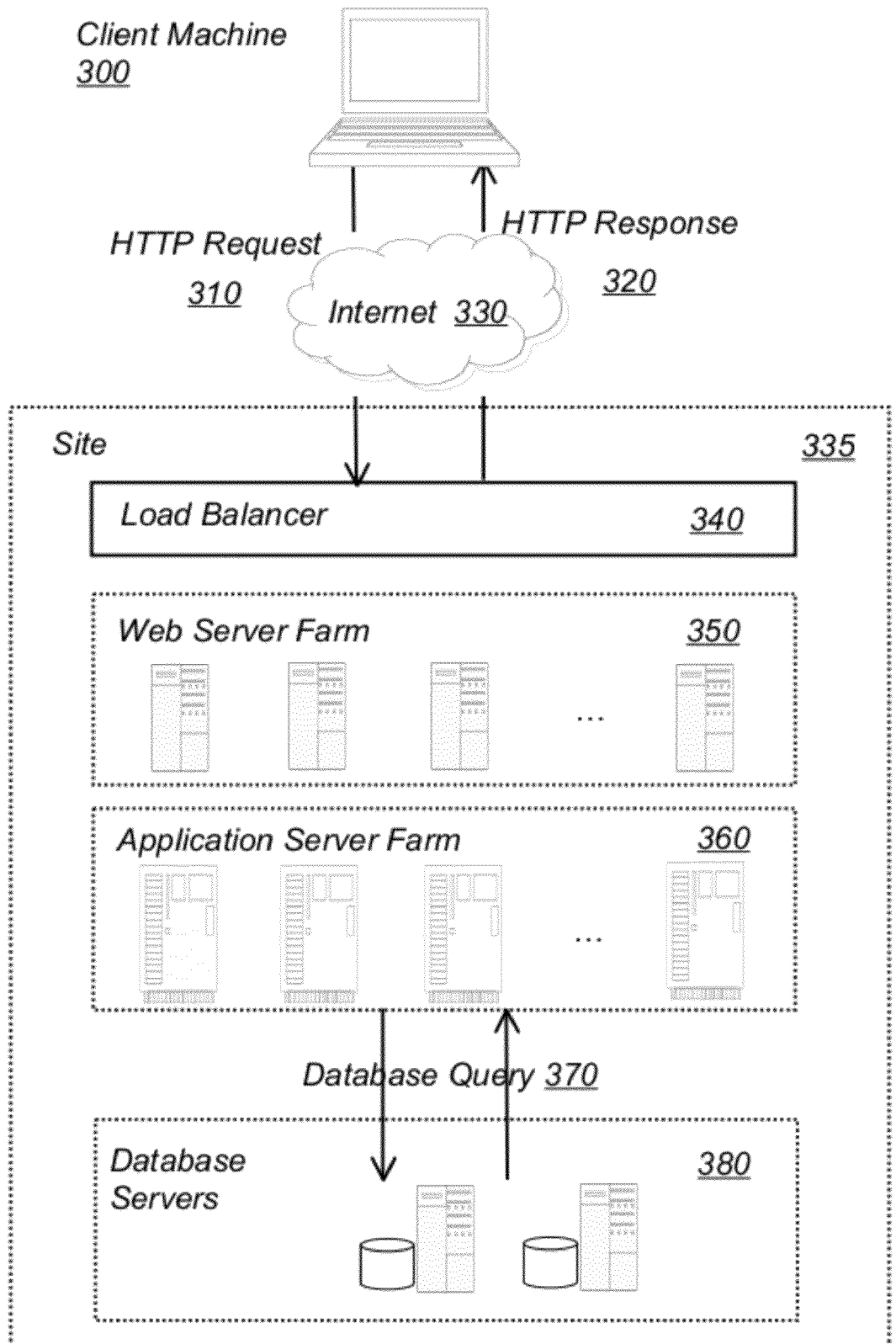
FIG. 3A is a block diagram of a cluster computing environment (prior art)
Figure 3B:
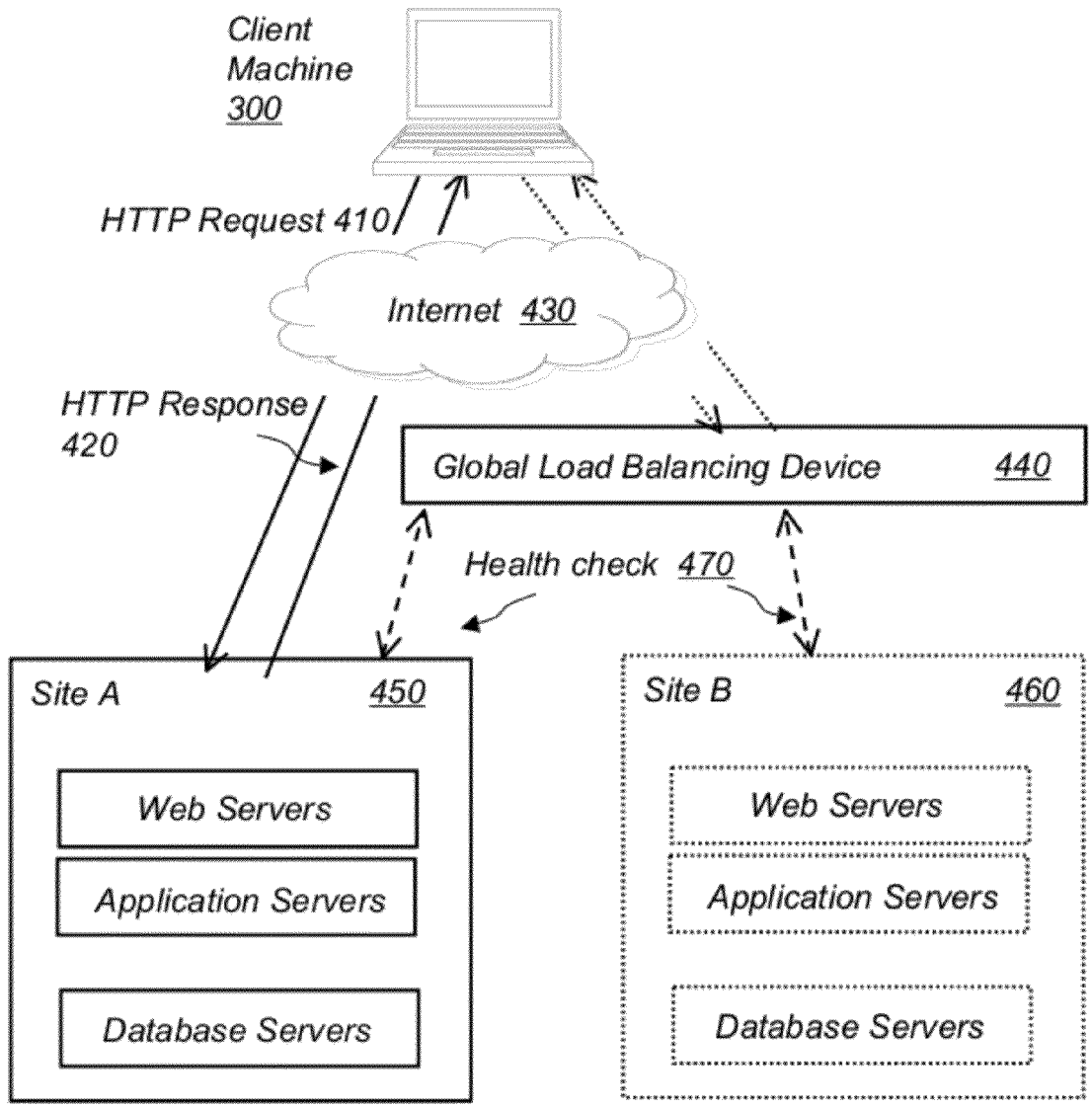
FIG. 3B is a schematic diagram of site-mirrored computing environment (prior art)
Figure 4:
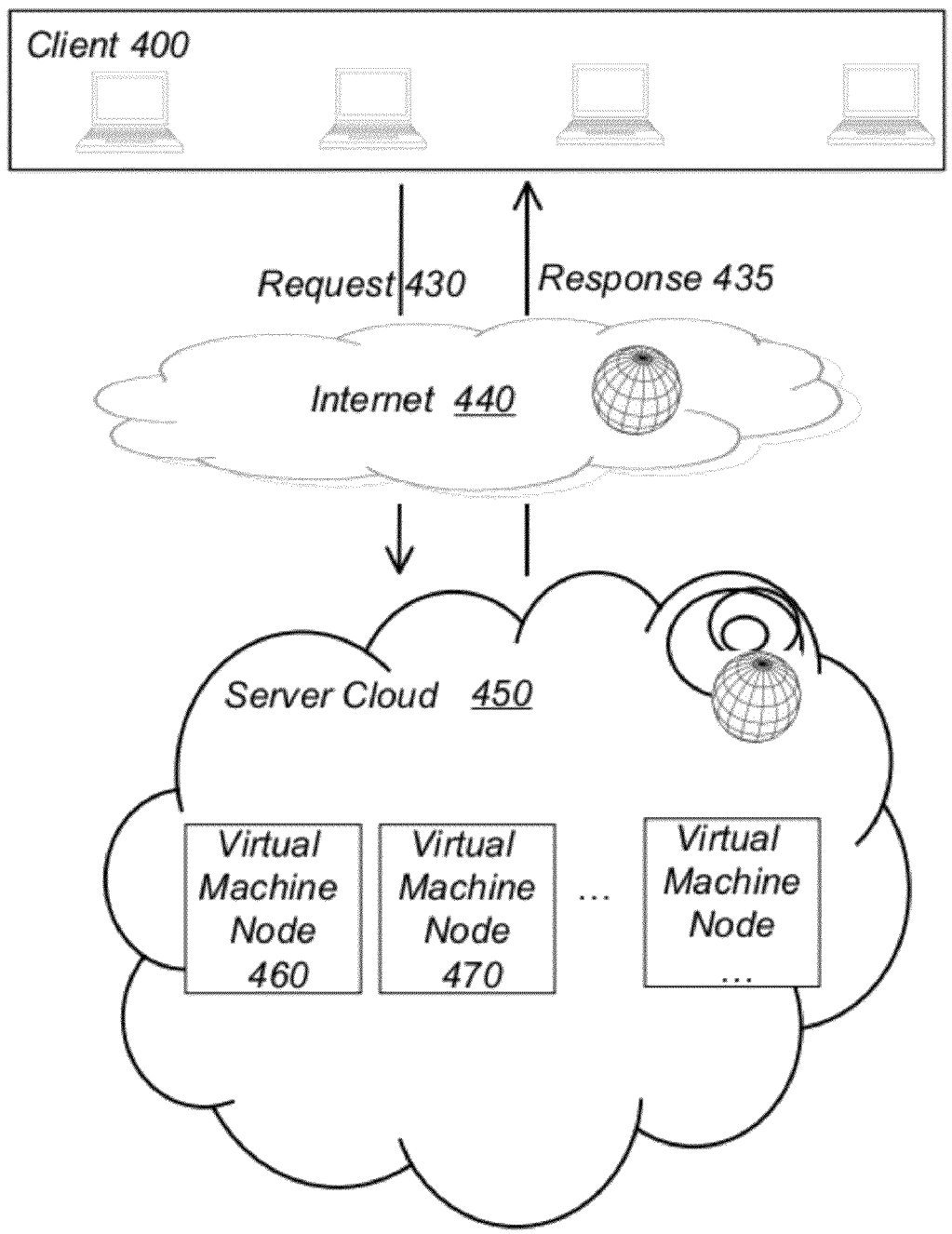
FIG. 4 is a schematic diagram of a cloud computing environment.
Figure 5:
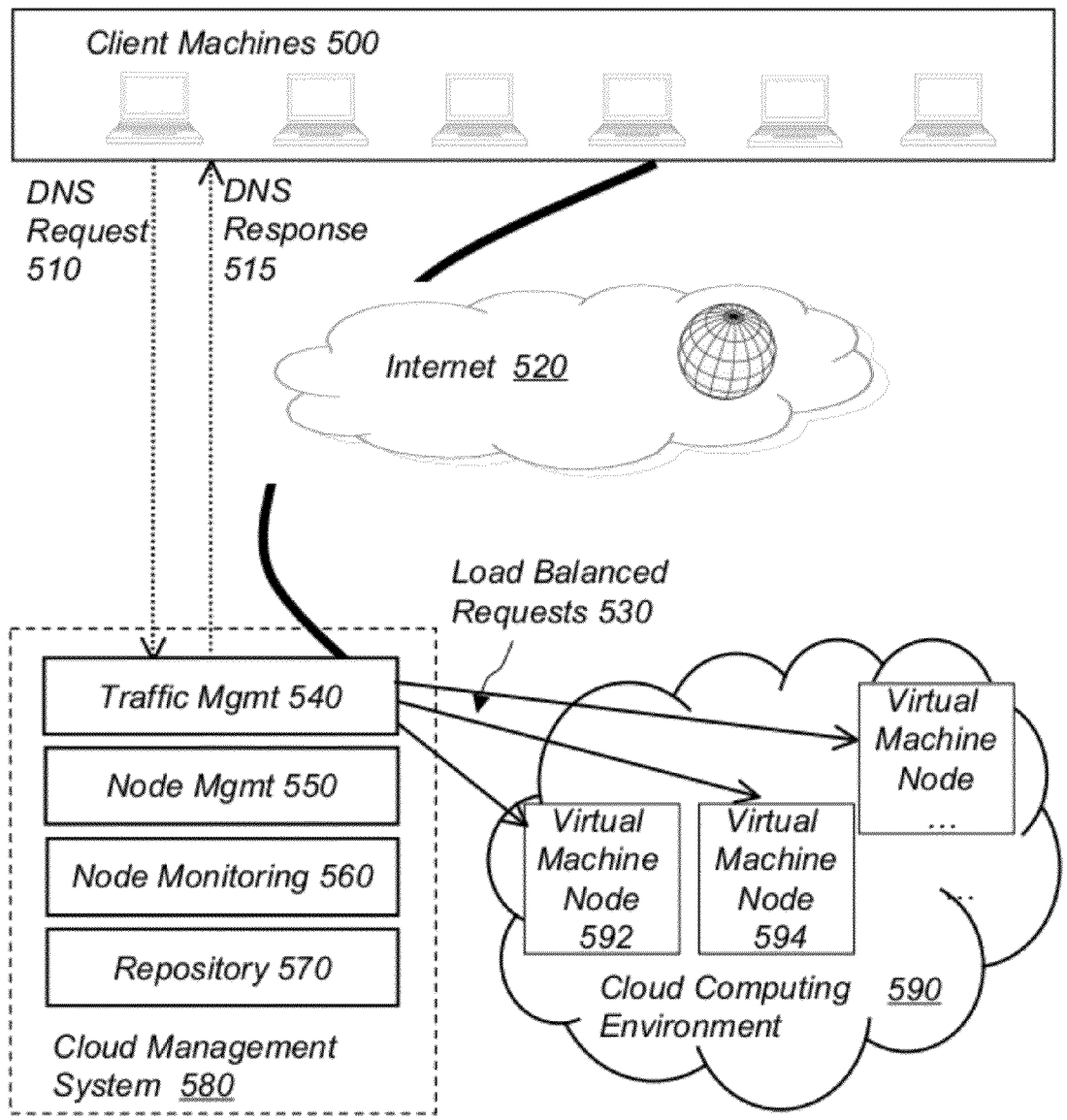
FIG. 5 is a schematic diagram of one embodiment of the cloud management system of this invention.

Referring to FIG. 5, an improved cloud computing environment includes client machines 500 accessing web applications running on virtual machine nodes 592, 594, in the cloud computing environment 590, via the Internet 520. The improved cloud computing environment also includes a cloud management system 580 that intercepts the network traffic from the clients 500 to the cloud computing environment 590 in order to provide traffic management, node management, node monitoring and load balancing, among others. The cloud management system 580 includes a traffic management module 540, a node management module 550, a node monitoring module 560 and a data repository 570.

Traffic management module 540 manages and load-balances requests 510 from clients 500 to different server nodes 592, 594 that the application is running on. These server nodes are typically virtual machine nodes in a cloud computing environment, but they can also be physical servers. Further, the traffic management module 540 routes a client request to a server node that is "optimal" from a performance point of view according to certain metrics. In one example the metrics is the geographic proximity between the client and the server node. For a global user base, selecting the "closest" server node to serve client requests can produce significant application performance acceleration. Unlike content delivery networks that provide acceleration for static content, traffic management module 540 delivers acceleration for both static as well as dynamic content.

The traffic management module 540 uses a Domain Name System (DNS) to provide Internet Protocol (IP) addresses for the "optimal" server node in a DNS hostname query. Such a technique can be used in any situation where the client requires access to a replicated network resource. It directs the client request to an appropriate replica so that the route to the replica is good from a performance standpoint. Further, the traffic management module 540 also takes session stickiness into consideration so that requests from the same client session are routed to the same server node persistently when session stickiness is required. Session stickiness, also known as "IP address persistence" or "server affinity" in the art, means that different requests from the same client session are always routed to the same server in a multi-server environment. "Session stickiness" is required for a variety of web applications to function correctly.

Node management module 550 provides services for managing the sever nodes 592, 594, such as starting a virtual machine (VM) instance, stopping a VM instance and recovering from a node failure, among others. In accordance to the node management policies in the system, this service launches new server nodes when the application is over loaded and it shuts down some server nodes when it detects these nodes are not necessary any more.

The node monitoring module 560 monitors the sever nodes 592, 594 over the network, collects performance and availability data, and provides feedback to the cloud management system 580. This feedback is then used to make decisions such as when to scale up and when to scale down.

Data repository 570 contains data for the cloud management system, such as Virtual Machine Image (VMI), application artifacts (files, scripts, and configuration data), routing policy data, and node management policy data, among others.

Figure 6:
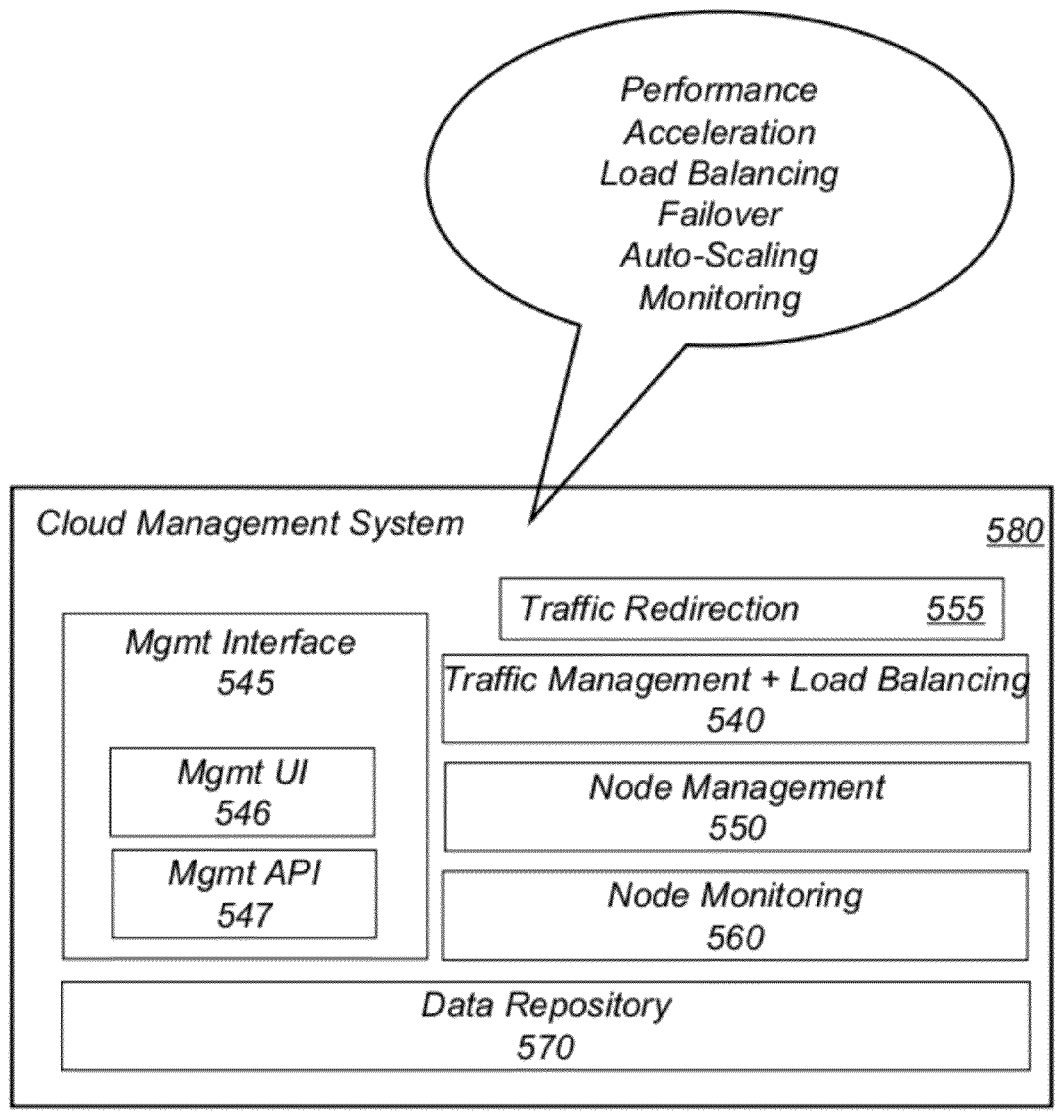
FIG. 6 is a block diagram showing the high level functional components of the cloud management system of FIG. 5.

Referring to FIG. 6, besides traffic management 540, node management 550, node monitoring 560 and data repository 570, the cloud management system 580 includes a management interface 545 that provides a user interface 546 (Mgmt UI) and a programmatic interface 547 (Mgmt API) for external parties to interact with the system. Using the management interface 545, one can configure the system and customize services for individual applications. Cloud management system 580 also includes a traffic redirection module 555 for redirecting internet traffic from the clients 500 to the cloud computing environment 590 to pass through the cloud management system 580, as shown in FIG. 5.

Figure 7:
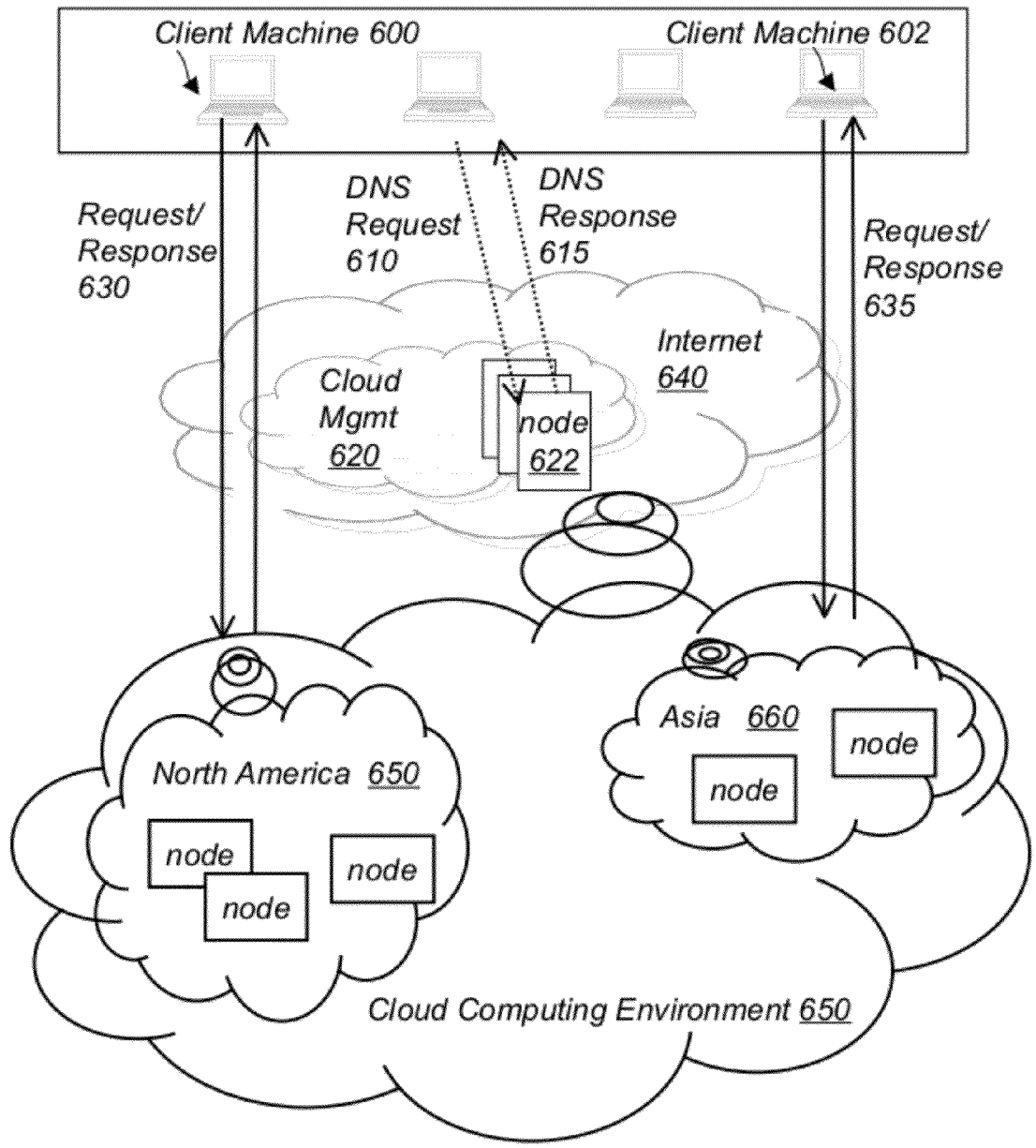
FIG. 7 is a schematic diagram showing the use of the cloud management system of this invention for managing traffic to server nodes running in different geographic regions.
Figure 8:
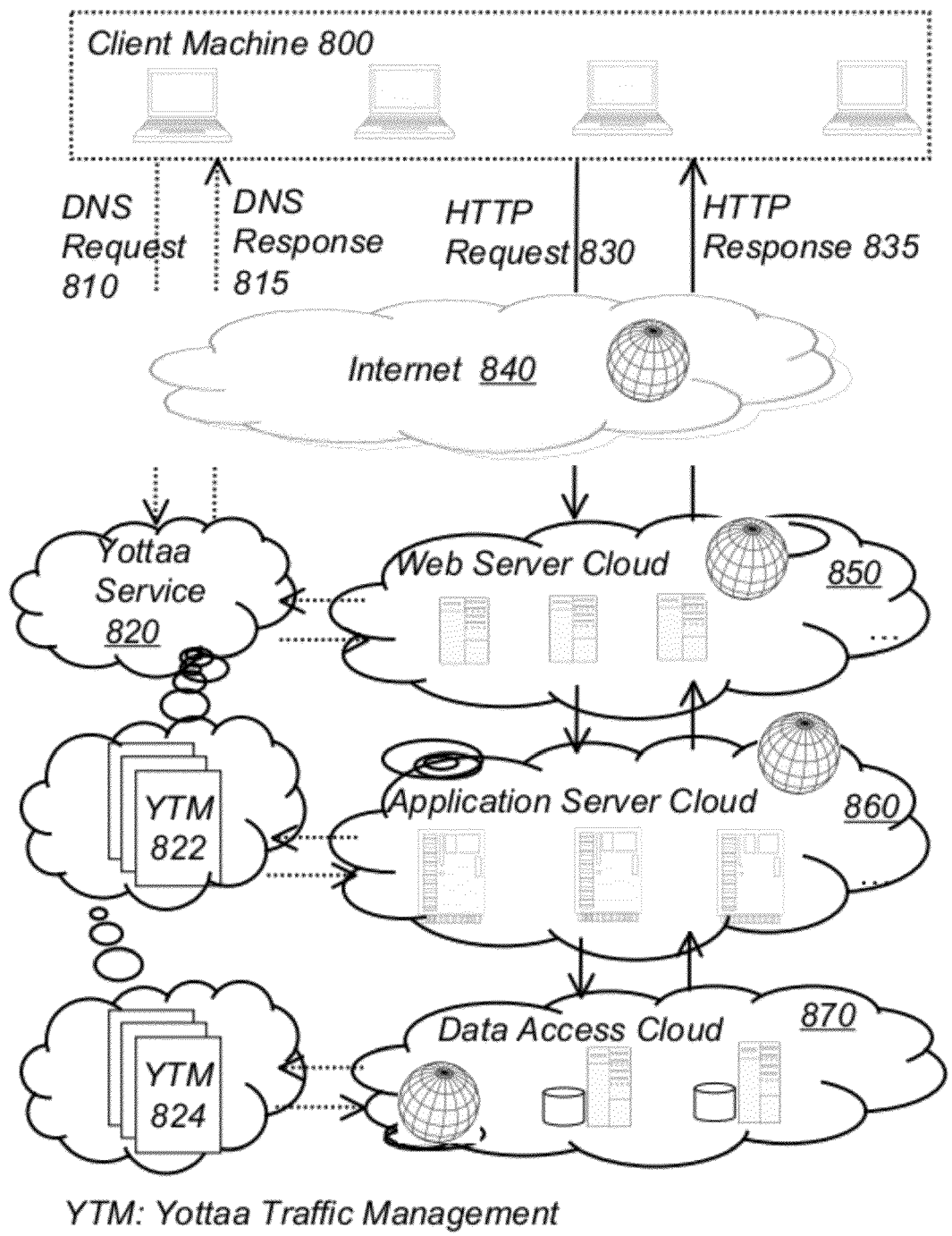
FIG. 8 is a schematic diagram showing an example of using the present invention to manage a web application in a cloud environment.
Figure 9:
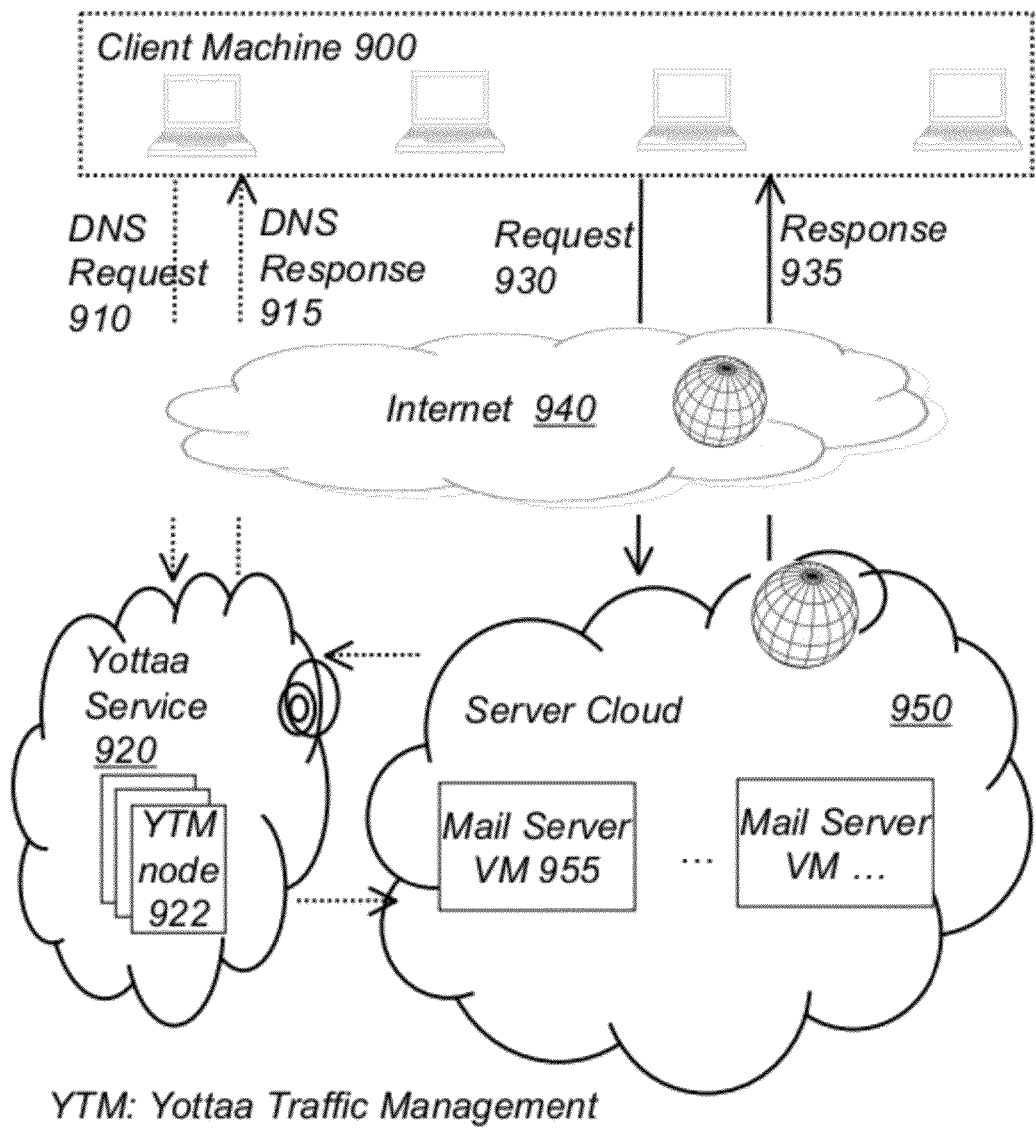
FIG. 9 is a schematic diagram showing an example of using the present invention to manage mail servers running in a cloud environment.

The cloud management system of FIG. 5 may be used to manage traffic among servers running in different regions in a cloud computing environment, as shown in FIG. 7. The invention may also be used in providing traffic management, performance acceleration, load balancing, and failover services for a variety of applications running in a cloud environment, such as web applications (shown in FIG. 8) and email applications (shown in FIG. 9), among others.

Figure 20:
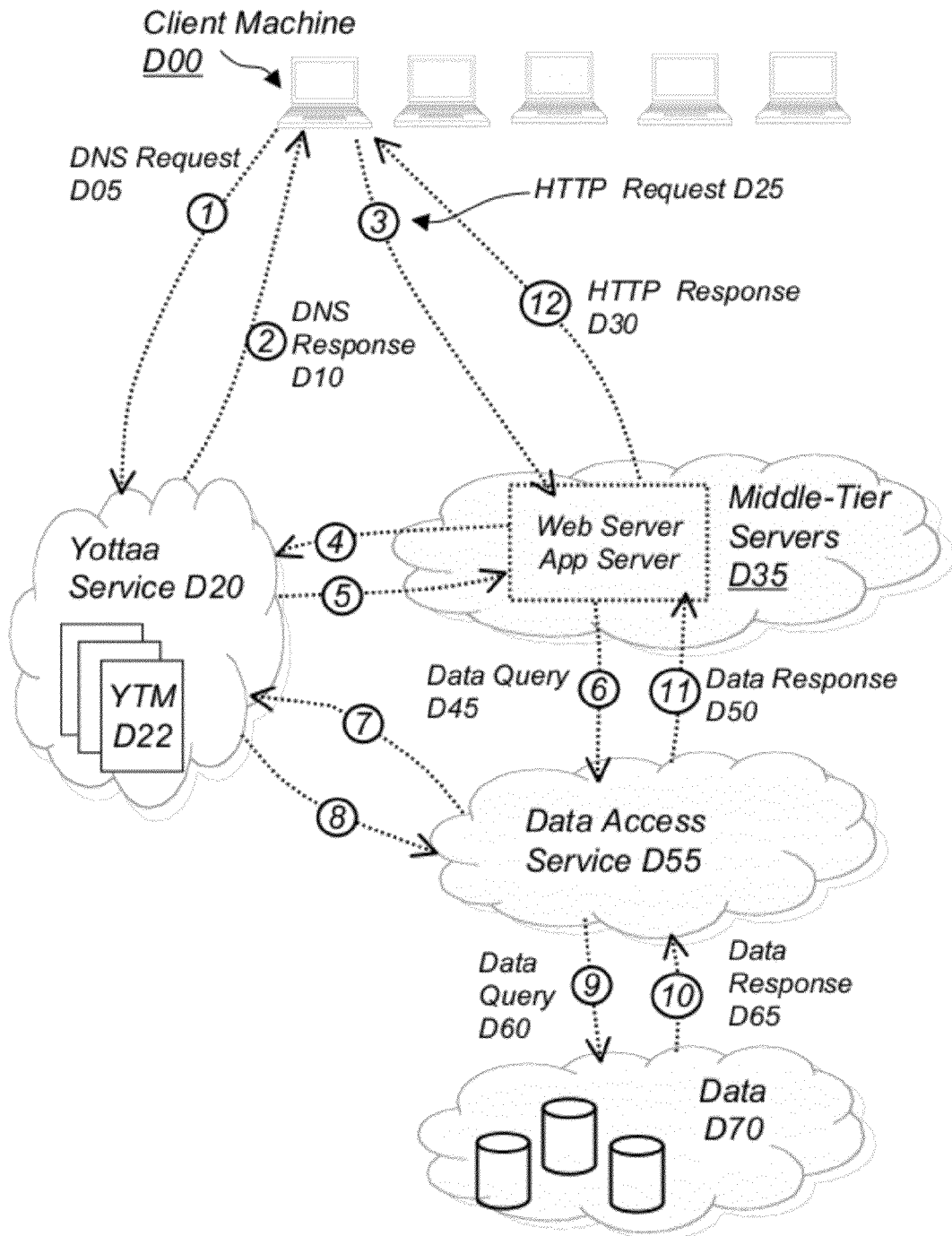
FIG. 20 shows how an HTTP request is served from a 3-tiered web application using the present invention.
Figure 21:
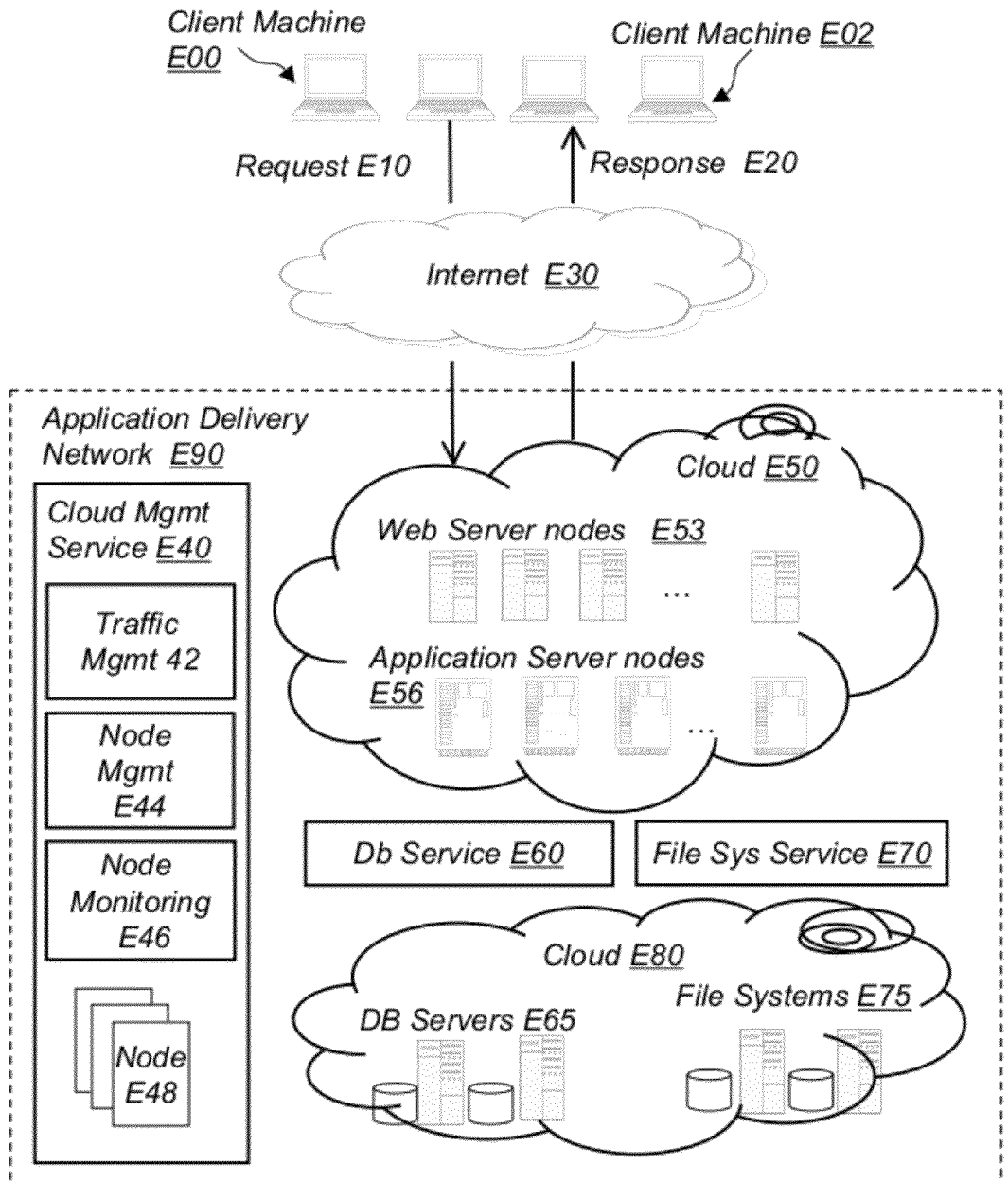
FIG. 21 shows the various function blocks of an Application Delivery Network including the cloud management system of the present invention.

In another example, the present invention is used to provide an on-demand service delivered over the Internet to web site operators to help them improve their web application performance, scalability and availability, as shown in FIG. 20. Service provider H00 manages and operates a global infrastructure H40 providing web performance related services, including monitoring, acceleration, load balancing, traffic management, auto scaling and failover. The global infrastructure also has a management and configuration user interface (UI) H30, as shown in FIG. 21, for customers to purchase, configure and manage services from the service provider. Customers include web operator H10, who owns and manages web application H50. Web application H50 may be deployed in one data center, a few data centers, in one location, in multiple locations, or run on virtual machines in a distributed cloud computing environment. System H40 provides services including monitoring, acceleration, traffic management, load balancing, failover and auto-scaling to web application H50 with the result of better performance, better scalability and better availability to web users H20. In return for using the service, web operator H10 pays a fee to service provider H00.

Figure 10:
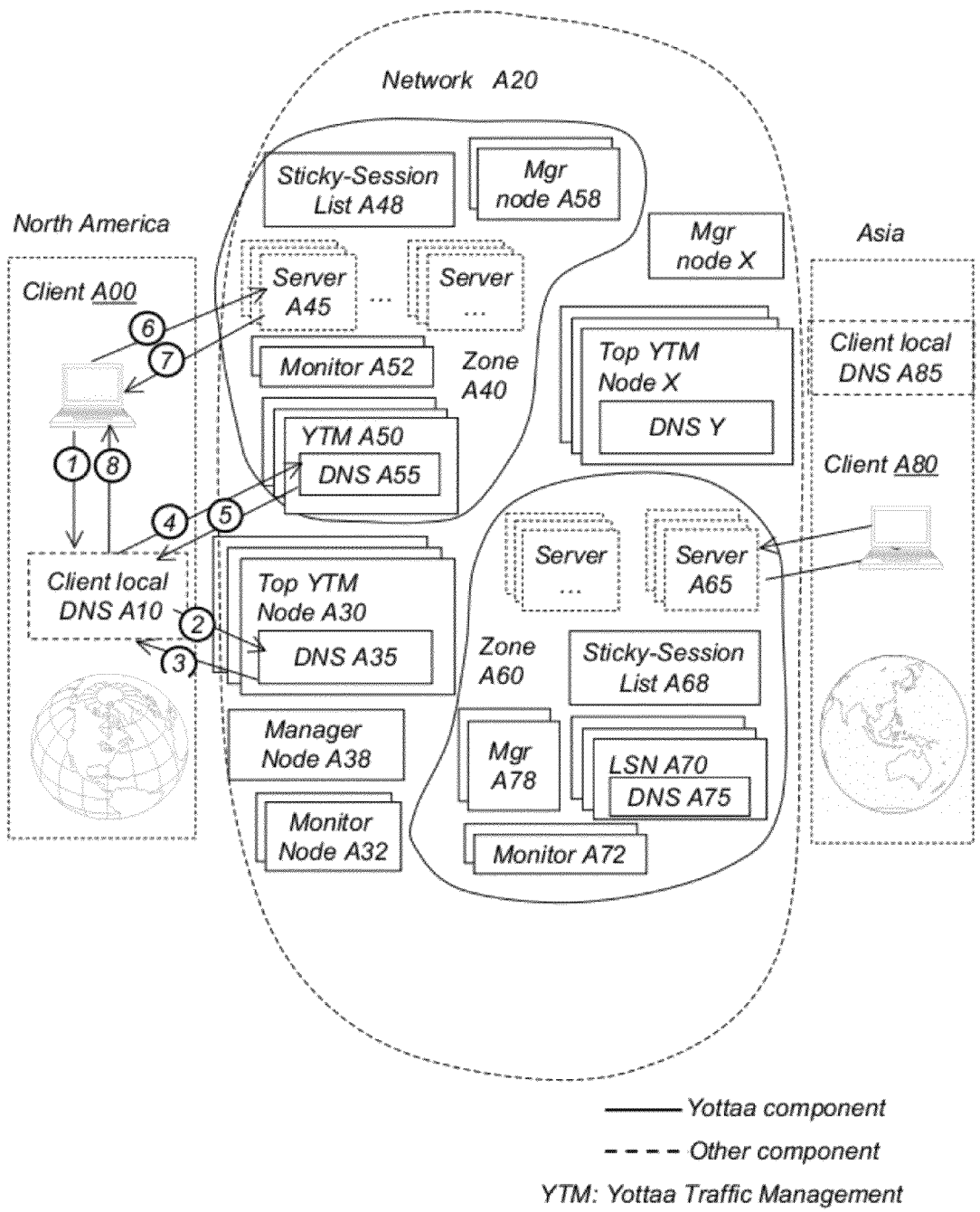
FIG. 10 is a schematic diagram showing details of another embodiment of the present invention referred to as "Yottaa"

FIG. 10 shows an embodiment of the present invention called "Yottaa" and depicts the architecture of Yottaa service and the steps of using Yottaa in resolving a request from client machine A00 located in North America to its closest server instance A45. Similarly, requests from client machine A80 located in Asia are directed to server A65 that is close to A80. The system is deployed over network A20. The network can be a local area network, a wireless network, and a wide area network such as the Internet, among others. The web application is running on nodes labeled as "Server", such as Server A45, Server A65. Each of the server nodes may be running an instance of a mail server application, a web application or some other kind application.

The entire network is divided into "zones", i.e., A40, A60. Each zone contains at least one YTM node. Normally there should be more than one YTM nodes in each zone for robustness reasons. When a manager node detects that there are fewer than expected number of YTM instances, it launches new YTM instances (if configuration policy permits so and certain conditions are met). All these YTM instances together manage the subset of server nodes inside this zone. Besides the zones, there are also YTM instances within the network that do not belong to any zone. These instances include top level Yottaa Traffic Management (top YTM) nodes A30.

In this embodiment, traffic management is implemented by using a Domain Name Server (DNS) based approach. Each YTM node contains a DNS module. The top level YTM nodes and lower level YTM nodes together form a hierarchical DNS tree that resolves hostnames to appropriate IP addresses of selected "optimal" server nodes by taking factors such as node load conditions, geographic proximity, network performance and session stickiness (if required) into consideration. As a result, client requests are load balanced and accelerated by connecting to "optimal" server nodes.

As was mentioned above, Yottaa divides all these server instances into different zones, often according to geographic proximity or network proximity. Each YTM node manages a list of server nodes. For example, YTM node A50 manages servers in Zone A40, such as Server A45. Over the network, Yottaa deploys several types of nodes including Yottaa Traffic Management (YTM) node, such as A30, A50, and A70, Yottaa Manager node, such as A38, A58 and A78 and Yottaa Monitor node, such as A32, A52 and A72. These three types of logical nodes are not required to be implemented as separate entities in actual implementation. Two of then, or all of them, can be combined into the same physical entity.

There are two types of YTM nodes: top level YTM node (such as A30) and lower level YTM node (such as A50 and A70). They are structurally identical but function differently. Whether an YTM node is a top level node or a lower level node is specified by the node's own configuration. Each YTM node contains a DNS module. For example, YTM A50 contains DNS A55. Further, if a hostname requires sticky-session support (as specified by web operators), a sticky-session list (such as A48 and A68) is created for the hostname of each application. This sticky session list is shared by YTM nodes that manage the same list of server nodes for this application. Top level YTM nodes provide services to lower level YTM nodes by directing DNS requests to them. In a cascading fashion, each lower level YTM node may provide similar services to its own set of "lower" level YTM nodes, establishing a DNS tree. Using such a cascading tree structure, the system prevents a node from being overwhelmed with too many requests, guarantees the performance of each node and is able to scale up to cover the entire Internet by just adding more nodes.

FIG. 10 shows architecturally how a client in one geographic region is directed to a "closest" server node. The meaning of "closest" is determined by the system's routing policy for the specific application. When client A00 wants to connect to a server, the following steps happen in resolving the client DNS request. First, Client A00 sends a DNS lookup request to its local DNS server A10. Local DNS server A10 (if it can not resolve the request directly) sends a request to a top level YTM A30, which then directs it to its DNS module A35 running inside A30. The selection of A30 is because YTM A30 is configured in the DNS record for the requested hostname of the web application. Upon receiving the request from A10, top YTM A30 returns a list of lower level YTM nodes to A10. The list is chosen according to the current routing policy, such as selecting 3 YTM nodes that are geographically closest to client local DNS A10. A10 receives the response, and sends the hostname resolution request to one of the returned lower level YTM nodes, i.e., A50. Lower level YTM node A50 receives the request, returns a list of IP addresses of server nodes selected according to its routing policy. In this case, server node A45 is chosen and returned because it is geographically closest to the client DNS A10. A10 returns the received list of IP addresses to client A00. A00 connects to Server A45 and sends a request. Server A45 receives the request from client A00, processes it and returns a response. Similarly, client A80 who is located in Asia is routed to Server A65 instead.

As shown in FIG. 6, the invention provides a web-based user interface (UI) 546 for web operators to configure the system. Web operators can also use other means such as making network-based Application Programming Interface (API) calls or modifying configuration files directly by the service provider. In one example, using a web-based UI, a web operator enters the hostname of the target web application, for example, www.yottaa.com. Next, the web operator enters the IP addresses of the static servers that the target web application is running on (if there are servers that the web application has already been deployed to directly by the web operator). Next, the web operator configures whether the system is allowed to launch new server instances in response to traffic demand spikes and the associated node management policy. Also, the web operator configures whether the system is allowed to shut down server nodes if capacity exceeds demand by a certain threshold. Next, the web operator adds the supplied top level traffic management node names to the DNS record of the hostname of the target application and then configures other parameters such as whether the hostname requires sticky-session support, session expiration value, and routing policy, among others. Once the system receives the above information, it performs the necessary actions to set up its service. For example, in the Yottaa embodiment, upon receiving the hostname and static IP addresses of the target server nodes, the system propagates such information to selected lower level YTM nodes (using the current routing policy) so that at least some lower level YTM nodes can resolve the hostname to IP address(es) when a DNS lookup request is received.

Figure 11:
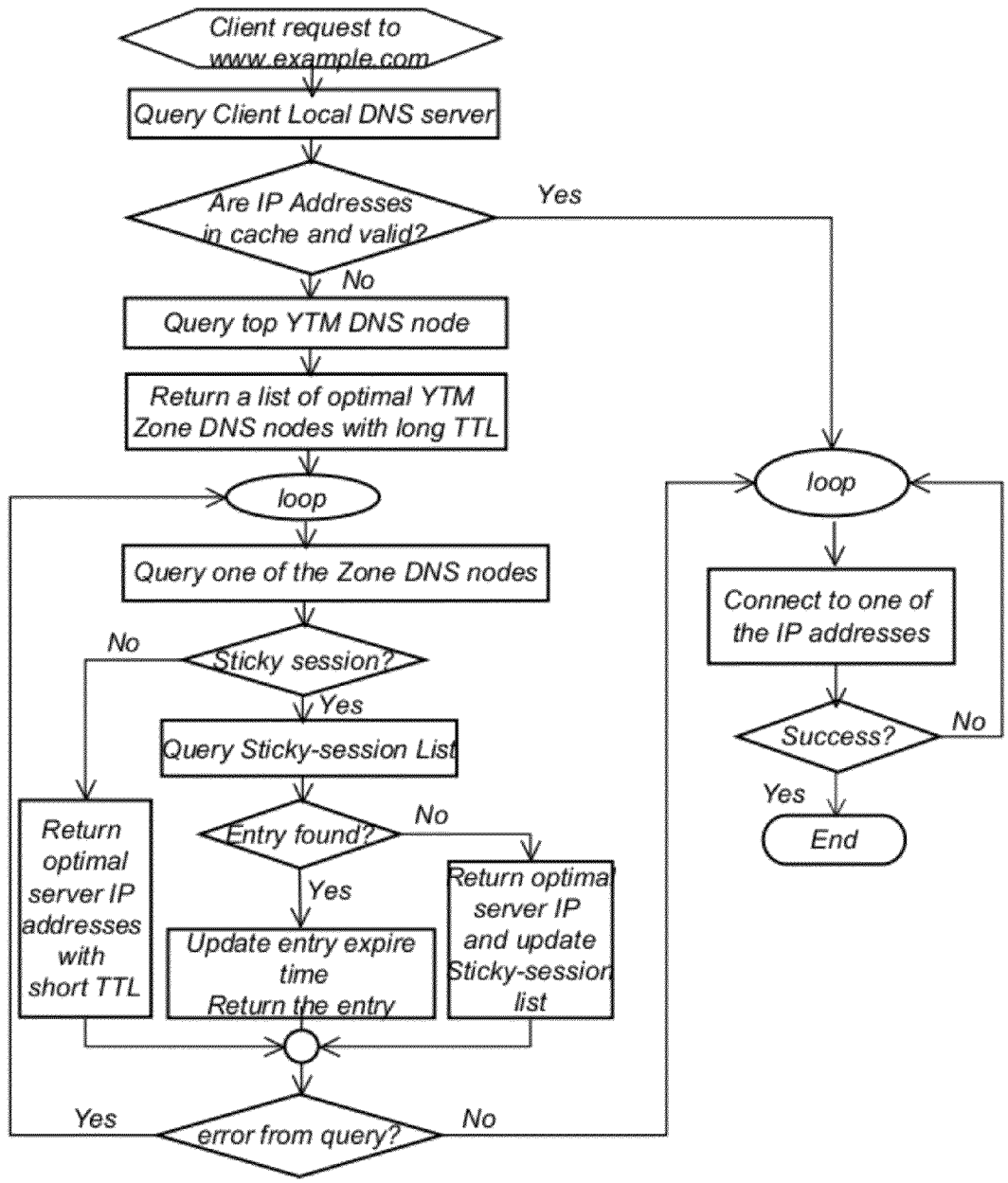
FIG. 11 is a flow diagram showing how Yottaa resolves a client request.

FIG. 11 shows a process workflow of how a hostname of a web application is resolved using the Yottaa service of FIG. 10. When a client wants to connect to a host of a web application, i.e., www.example.com, it needs to resolve the IP address of the hostname first. To do so, it queries its local DNS server. The local DNS server first checks whether such a hostname is cached and still valid from a previous resolution. If so, the cached result is returned. If not, client DNS server issues a request to the pre-configured DNS server for www.example.com, which is a top level YTM node. The top level YTM node returns a list of lower level YTM nodes according to a repeatable routing policy configured for this application. For example, the routing policy can be related to the geo-proximity between the lower level YTM node and the client DNS server A10, a pre-computed mapping between hostnames and lower level YTM nodes, or some other repeatable policy. Whatever policy is used, the top level YTM node guarantees the returned result is repeatable. If the same client DNS server requests the same hostname resolution again later, the same list of lower level YTM nodes is returned. Upon receiving the returned list of YTM nodes, client DNS server needs to query these nodes until a resolved IP address is received. So it sends a request to one of the lower level YTM nodes in the list. The lower level YTM receives the request. First, it figures out whether this hostname requires sticky-session support. Whether a hostname requires sticky-session support is typically configured by the web operator during the initial setup of the subscribed Yottaa service (can be changed later). If sticky-session support is not required, the YTM node returns a list of IP addresses of "optimal" server nodes that are mapped to www.example.com, chosen according to the current routing policy.

If sticky-session support is required, the YTM node first looks for an entry in the sticky-session list using the hostname (in this case, www.example.com) and the IP address of the client DNS server as the key. If such an entry is found, the expiration time of this entry in the sticky-session list is updated to be the current time plus the pre-configured session expiration value (When a web operator performs initial configuration of Yottaa service, he enters a session expiration timeout value into the system, such as one hour). On the other side, if no entry is found, the YTM node picks an "optimal" server node according to the current routing policy, creates an entry with the proper key and expiration information, and inserts this entry into the sticky-session list. Finally, the server node's IP address is returned to the client DNS server. If the same client DNS server queries www.example.com again before the entry expires, the same IP address will be returned. If an error is received during the process of querying a lower level YTM node, the client DNS server will query the next YTM node in the list. So the failure of an individual lower level YTM node is invisible to the client. Finally, the client DNS server returns the received IP address(es) to the client. The client can now connect to the server node. If there is an error connecting to a returned IP address, the client will try to connect to the next IP address in the list, until a connection is successfully made.

Top YTM nodes typically set a long time-to-live (TTL) value for its returned results. Doing so minimizes the load on top level nodes as well as reduces the number of queries from the client DNS server. On the other side, lower YTM nodes typically set a short Time-to-live value, making the system very responsive to node status changes.

The sticky-session list is periodically cleaned up by purging the expired entries. An entry expires when there is no client DNS request for the same hostname from the same client DNS server during the entire session expiration duration since the last lookup. Further, web operators can configure the system to map multiple (or using a wildcard) client DNS servers to one entry in the sticky-session table. In this case, DNS query from any of these client DNS servers receives the same IP address for the same hostname when sticky-session support is required.

During a sticky-session scenario, if the server node of a persistent IP address goes down, a Monitor node detects the server failure, notifies its associated Manager nodes. The associated Manager nodes notify the corresponding YTM nodes. These YTM nodes then immediately remove the entry from the sticky-session list, and direct traffic to a different server node. Depending on the returned Time-to-live value, the behavior of client DNS resolvers and client DNS servers, and how the application is programmed, users who were connected to the failed server node earlier may see errors duration the transition period. However, only this portion of users, and only during a short period of time, is impacted. Upon TTL expiration, which is expected to be short given that lower level YTM nodes set short TTL, these users will connect to a different server node and resume their operations.

Further, for sticky-session scenarios, the system manages server node shutdown intelligently so as to eliminate service interruption for these users who are connected to this server node. It waits until all user sessions on this server node have expired before finally shutting down the node instance.

Yottaa leverages the inherit scalability designed into the Internet's DNS system. It also provides multiple levels of redundancy in every step (except for sticky-session scenarios that a DNS lookup requires a persistent IP address). Further, the system uses a multi-tiered DNS hierarchy so that it naturally spreads loads onto different YTM nodes to efficiently distribute load and be highly scalable, while be able to adjust TTL value for different nodes and be responsive to node status changes.

Figure 12:
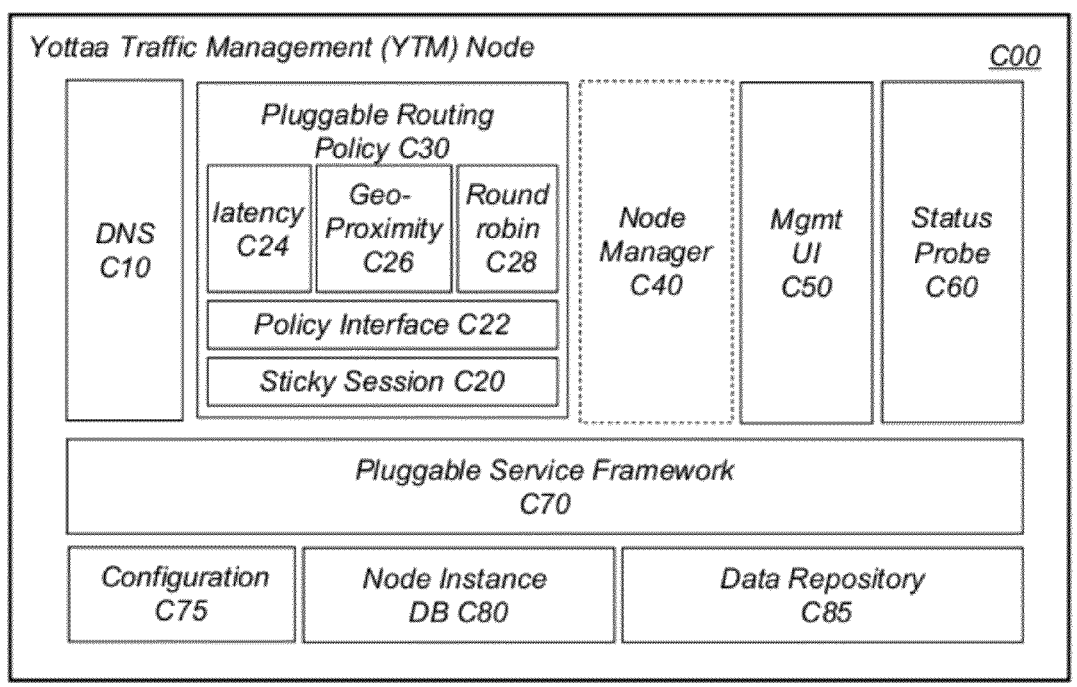
FIG. 12 is a block diagram showing the architecture of a Yottaa Traffic Management node.

FIG. 12 shows the functional blocks of a Yottaa Traffic Management node, shown as C00 in this diagram. The YTM node contains DNS module C10 that perform standard DNS functions, Status Probe module C60 that monitors status of this YTM node itself and responds to status inquires, Management UI module C50 that enables System Administrators to manage this node directly when necessary, Node Manager C40 (optional) that can manage server nodes over a network and a Routing Policy module C30 that manages routing policy. The routing policy module can load different routing policy as necessary. Part of module C30 is an interface for routing policy and another part of this module provide sticky-session support during a DNS lookup process. Further, YTM node C00 contains Configuration module C75, node instance DB C80, and Data Repository module C85.

Figure 13:
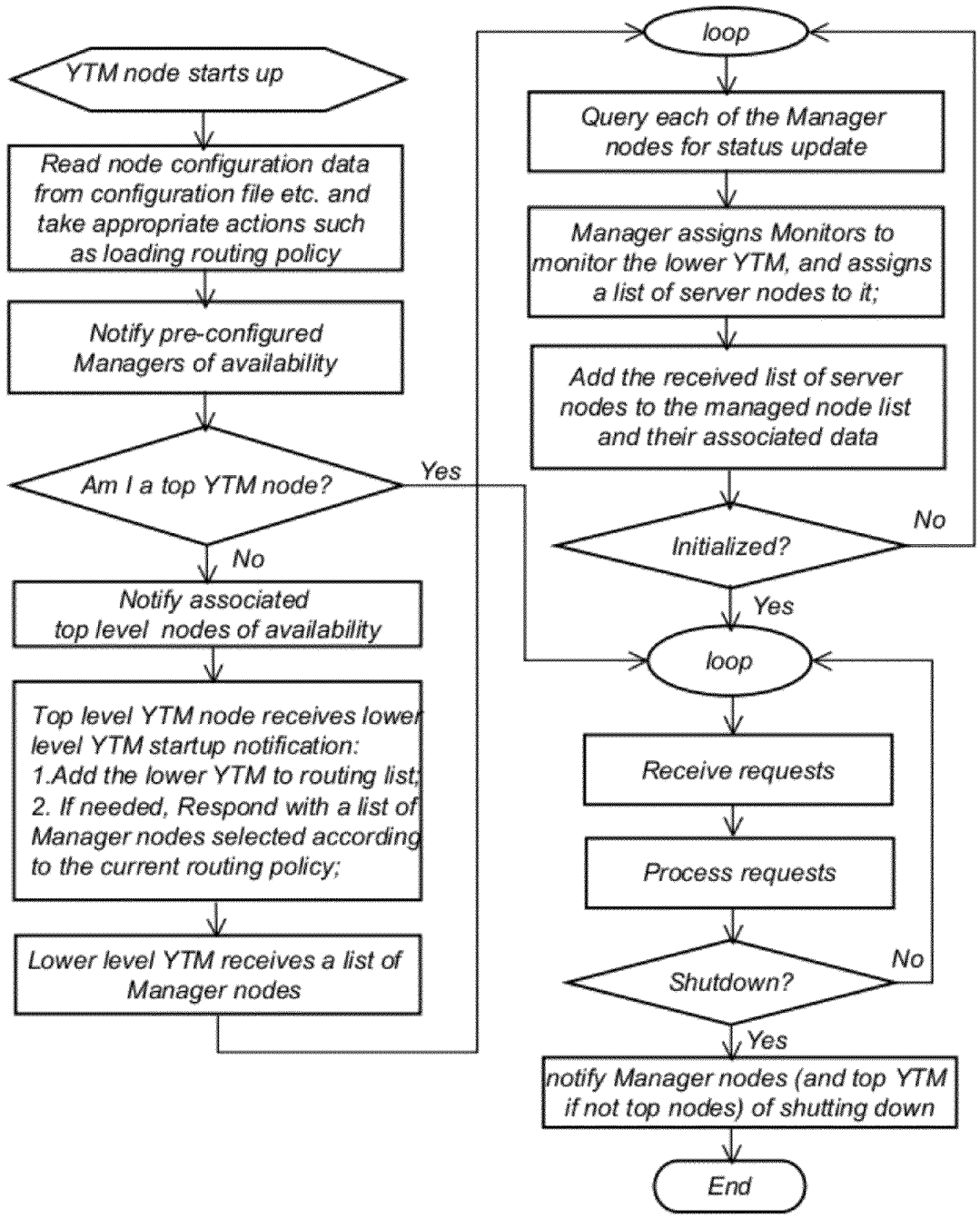
FIG. 13 shows the life cycle of a Yottaa Traffic Management node.

FIG. 13 shows how a YTM node works. When a YTM node boots up, it reads initialization parameters from its environment, its configuration file, instance DB and so on. During the process, it takes proper actions as necessary, such as loading a specific routing policy for different applications. Further, if there are Managers specified in the initialization parameters, the node sends a startup availability event to such Managers. Consequentially, these Managers propagate a list of server nodes to this YTM node and assign Monitors to monitor the status of this YTM node. Then the node checks to see if it is a top level YTM according to its configuration parameters. If it is a top level YTM, the node enters its main loop of request processing until eventually a shutdown request is received or a node failure happened. Upon receiving a shutdown command, the node notifies its associated Managers of the shutdown event, logs the event and then performs shutdown. If the node is not a top level YTM node, it continues its initialization by sending a startup availability event to a designated list of top level YTM nodes as specified in the node's configuration data.

When a top level YTM node receives a startup availability event from a lower level YTM node, it performs the following actions. First, it adds the lower level YTM node to the routing list so that future DNS requests maybe routed to this lower level YTM node. If the lower level YTM node does not have associated Managers set up already (as indicated by the startup availability event message), selects a list of Managers according to the top level YTM node's own routing policy, and returns this list of Manager nodes to the lower level YTM node.

When a lower level YTM node receives the list of Managers from a top level YTM node, it continues its initialization by sending a startup availability event to each Manager in the list. When a Manager node receives a startup availability event from a lower level YTM node, it assigns Monitor nodes to monitor the status of the YTM node. Further, the Manager returns the list of server nodes that is under management by this Manager to the YTM node. When the lower level YTM node receives a list of server nodes from a Manager node, it is added to the managed server node list that this YTM node manages so that future DNS requests maybe routed to servers in the list. After the YTM node completes setting up its managed server node list, it enters its main loop for request processing. For example:

If a DNS request is received, the YTM node returns one or more server nodes from its managed server node list according to the routing policy for the target hostname and client DNS server.

If the request is a server node down event from a Manager node, the server node is removed from the managed server node list.

If a server node startup event is received, the new server node is added to the managed server node list.

Finally, if a shutdown request is received, the YTM node notifies its associated Manager nodes as well as the top level YTM nodes of its shutdown, saves the necessary state into its local storage, logs the event and shuts down.

Figure 14:
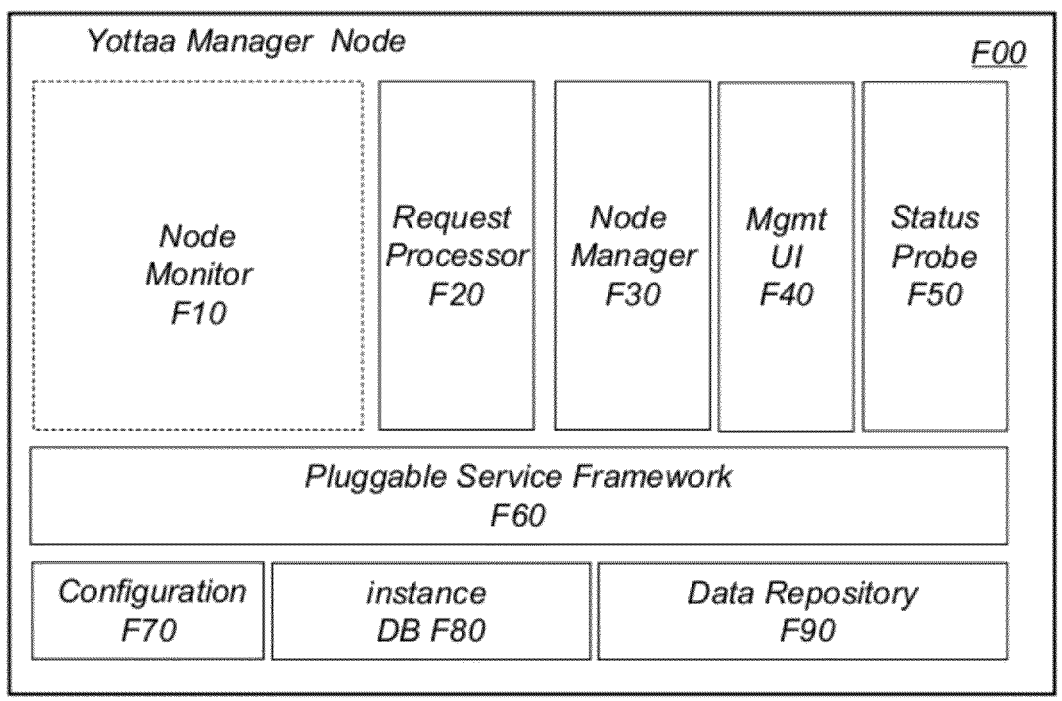
FIG. 14 shows the architecture of a Yottaa Manager node.

FIG. 14 shows the functional blocks of a Yottaa Manager node, shown as F00 in this diagram and as A38 and A58 in FIG. 10. Yottaa Manager nodes perform a variety of functions such as assigning nodes to associated Monitors for monitoring, receiving notification events from Monitors about node status changes, notifying YTM nodes of such status changes, starting or stopping node instances, among others. Yottaa Manager node contains a Request Processor module F20 that processes requests received from other nodes over the network, a Node Manager module F30 that can be used to manage virtual machine instances, a Management User Interface (UI) module F40 that can be used to configure the node locally, and a Status Probe module F50 that monitors the status of this node itself and responds to status inquires. Optionally, if a Monitor node is combined into this node, the Manager node then also contains Node Monitor module F10 that maintains the list of nodes to be monitored and periodically polls nodes in the list according to the current monitoring policy.

Figure 15:
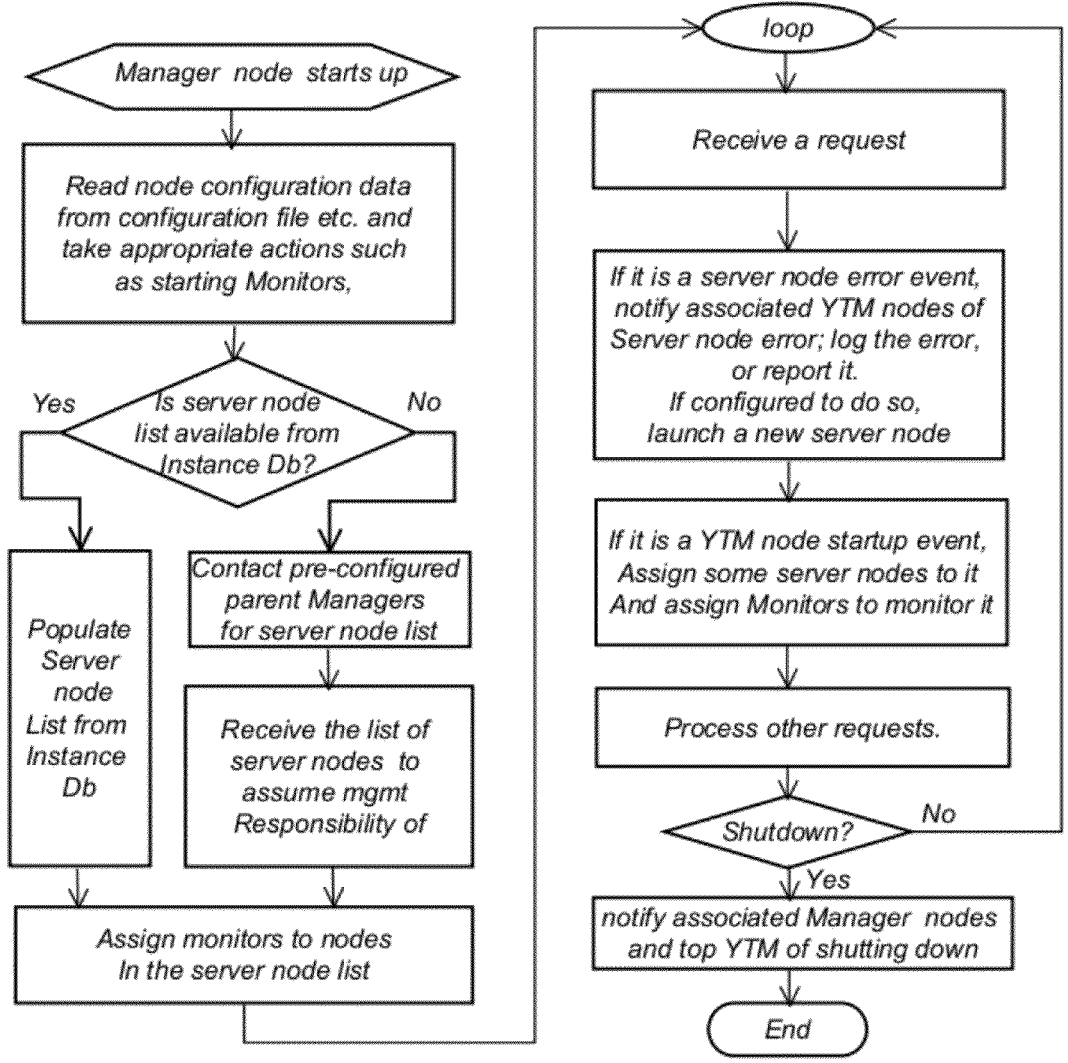
FIG. 15 shows the life cycle of a Yottaa Manager node.

FIG. 15 shows how a manager node works. When it starts up, it reads configuration data and initialization parameters from its environment, configuration file, instance DB and so on. Proper actions are taken during the process. Then it sends a startup availability event to a list of parent Managers as specified from its configuration data or initialization parameters. When a parent Manager receives the startup availability event, it adds this new node to its list of nodes under "management", and "assigns" some associated Monitor nodes to monitor the status of this new node by sending a corresponding request to these Monitor nodes. Then the parent Manager delegates the management responsibilities of some server nodes to the new Manager node by responding with a list of such server nodes. When the child Manager node receives a list of server nodes of which it is expected to assume management responsibility, it assigns some of its associated Monitors to do status polling, performance monitoring of the list of server nodes. If no parent Manager is specified, the Yottaa Manager is expected to create its list of server nodes from its configuration data. Then the Manager node finishes its initialization and enters its main processing loop of request processing. If the request is a startup availability event from an YTM node, it adds this YTM node to the monitoring list and replies with the list of server nodes for which it assigns the YTM node to do traffic management. Note that, in general, the same server node is be assigned to multiple YTM nodes for routing. If the request is a shutdown request, it notifies its parent Managers of the shutdown, logs the event, and then performs shutdown. If a node error request is reported from a Monitor node, the Manager removes the error node from its list (or move it to a different list), logs the event, and optionally reports the event. If the error node is a server node, the Manager node notifies the associated YTM nodes of the server node loss, and if configured to do so and a certain conditions are met, attempts to re-start the node or launch a new server node.

Figure 16:
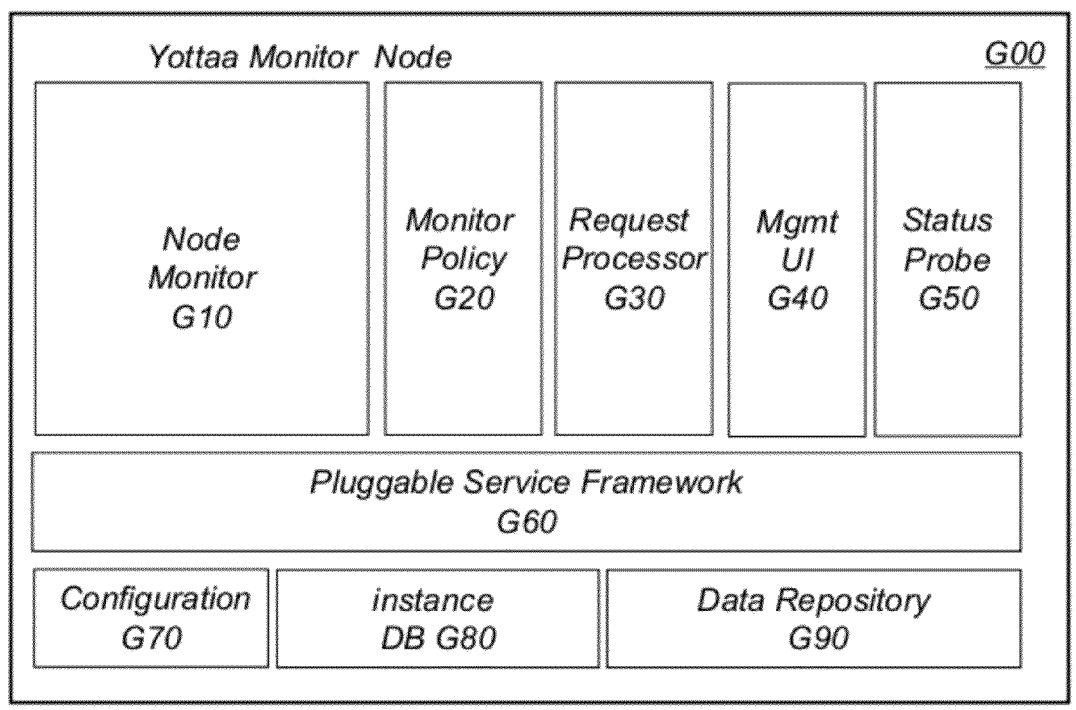
FIG. 16 shows the architecture of a Yottaa Monitor node.

FIG. 16 shows the functional blocks of the Monitor Node, shown as G00 in this diagram and as A32, A52 and A72 in FIG. 10. Monitor node G00 includes a node monitor G10, monitor policy G20, request processor G30, management UI G40, status probe G50, a pluggable service framework G60, configuration G70, instance database G80 and data repository G90. Yottaa Monitor nodes perform the function of monitoring the status of a list of assigned nodes. Each Monitor node reports to a few Manager nodes, which assign nodes and the associated monitoring policy to this Monitor node. The assigned nodes may include static server nodes that the customer application is running on, virtual machine nodes that the application is deployed to dynamically and other Yottaa nodes such as YTM nodes, Managers and Monitors. When an event such as node failure is detected, the Monitor notifies Managers of the status change and then it is up to the Managers to decide whether and what actions should be taken.

When a Manager receives an event from a monitor node, it checks the current node management policy and other statistics to figure out whether it should take node management actions. If the policy permits and if the statistics predict an upcoming traffic spike, the Manager starts new server nodes, and notifies YTM nodes to spread traffic to the new server nodes. On the other side, if the policy permits and the statistics show significantly decreased traffic demand, the Manager node notifies YTM nodes stop sending traffic to a certain server nodes and then shuts down these nodes.

Figure 17:
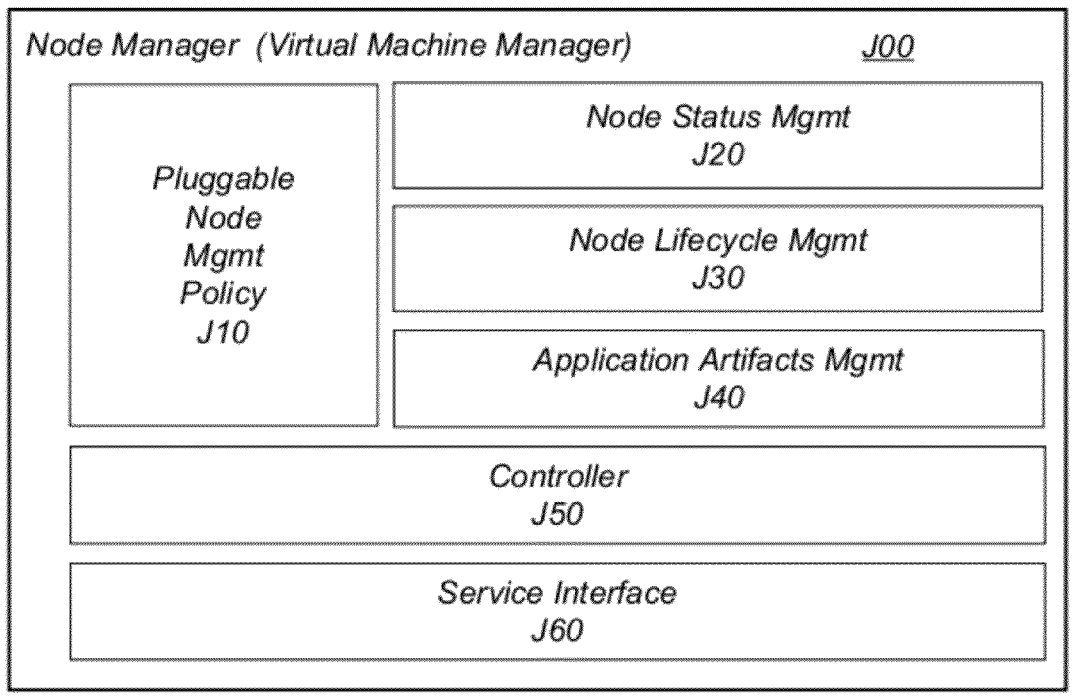
FIG. 17 shows the building blocks of a Node Manager module.

FIG. 17 shows the functional blocks of the Node Management module J00, one of the major building blocks of a cloud management system. Node Manager provides service to manage nodes over the network. An important component is Node Management policy J10. A node management policy is created when the web operator configures the cloud management system for his applications by specifying whether the system is allowed to dynamically start or shut down nodes in response to application load condition changes, the application artifacts to use for launching new nodes, initialization parameters associated with new nodes, and so on. According to the node management policy in the system, the node management service launches new server nodes when the application is over loaded. It shuts down some server nodes when it detects these nodes are not needed any more. As stated earlier, the behavior can be customized using either the management UI or via API calls. For example, a web operator can schedule a capacity scale-up to a certain number of server nodes (or to meet a certain performance metric) in anticipation of an event that would lead to significant traffic demand.

Figure 18:
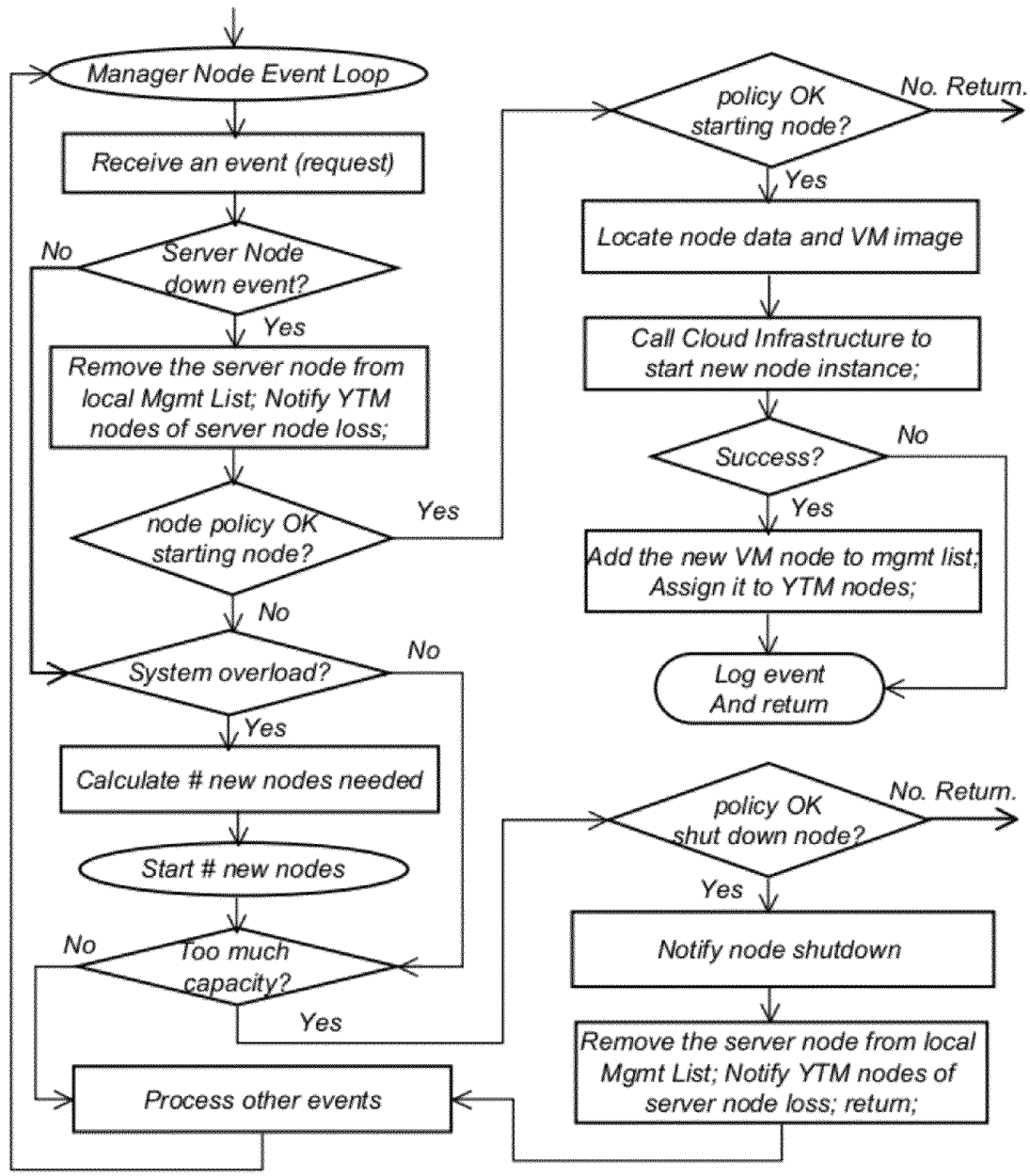
FIG. 18 shows the work flow of how a Node Manager module manages virtual machine nodes.
Figure 19:
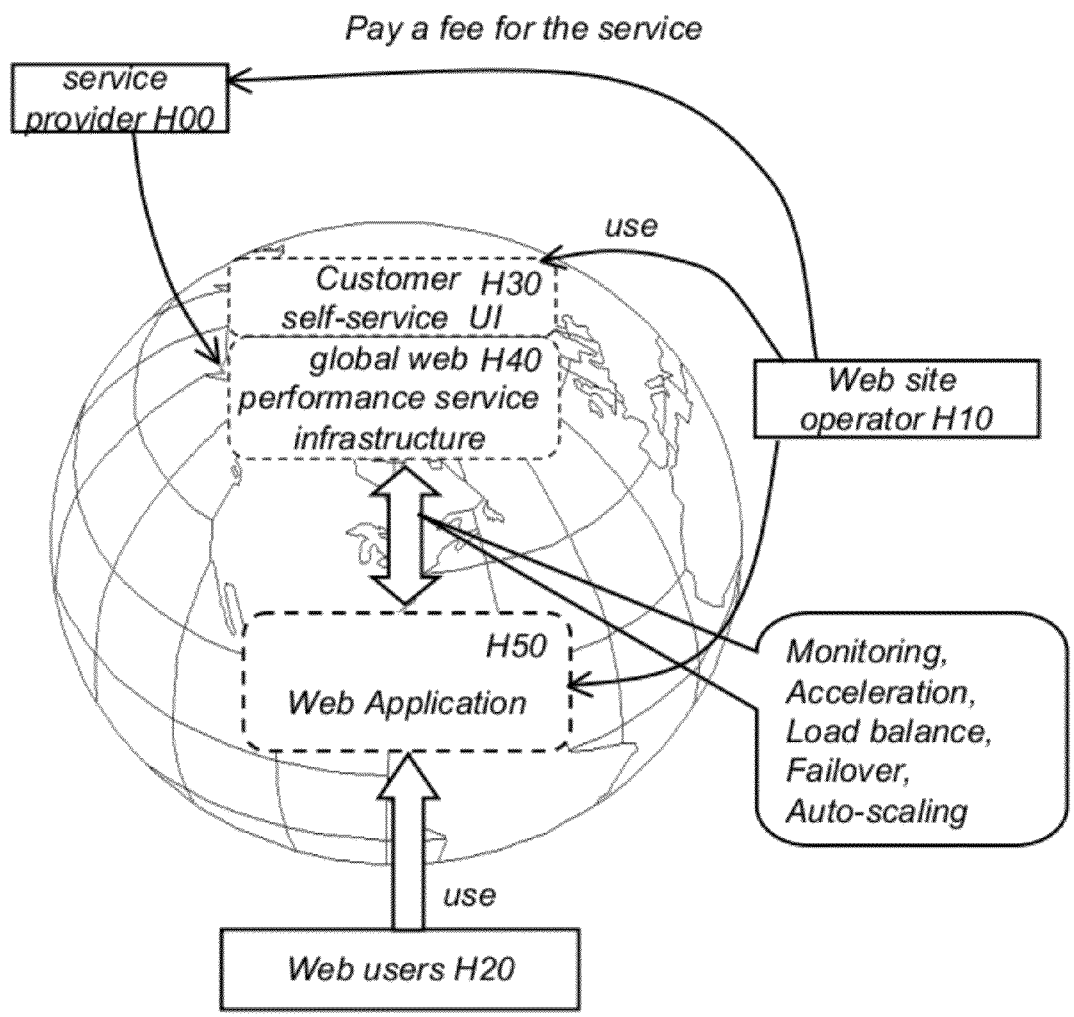
FIG. 19 shows a schematic diagram of using the invention of FIG. 5 to deliver a web performance service over the Internet to web site operators.

FIG. 18 shows the node management workflow. When the cloud management system receives a node status change event from its monitoring agents, it first checks whether the event signals a server node down. If so, the server node is removed from the system. If the system policy says "re-launch failed nodes", the Node Manager will try to launch a new server node. Then the system checks whether the event indicates that the current set of server nodes are getting over loaded. If so, at a certain threshold, and if the system's policy permits, a node manager will launch new server nodes and notify the traffic management service to spread load to the new nodes. Finally, the system checks to see whether it is in the state of "having too much capacity". If so and the node management policy permits, a Node Manager will try to shut down a certain number of server nodes to eliminate capacity waste.

In launching new server nodes, the system picks the best geographic region to launch the new server node. Globally distributed cloud environments such as Amazon.com's EC2 cover several continents. Launching new nodes at appropriate geographic locations help spread application load globally, reduce network traffic and improve application performance. In shutting down server nodes to reduce capacity waste, the system checks whether session stickiness is required for the application. If so, shutdown is timed until all current sessions on these server nodes have expired.

Several embodiments of the present invention have been described. Nevertheless, it will be understood that various modifications may be made without departing from the spirit and scope of the invention. Accordingly, other embodiments are within the scope of the following claims.

What is claimed is:

1. A method for auto-scaling the infrastructure capacity of an application in response to client demands, comprising:
   providing an application configured to run on an application infrastructure comprising a plurality of server nodes and to be accessed by clients via a first network;
   providing a cloud management system wherein said cloud management system comprises a traffic management system (TMS), a node management system, a node monitoring system and a data depository, and wherein said TMS directs traffic from said clients to said server nodes of the application infrastructure, wherein said node monitoring system gathers performance metrics of said application and metrics of the application infrastructure, wherein said node management system controls and changes said application infrastructure based on said gathered application performance metrics and said application infrastructure metrics, and wherein said data depository comprises data used in the cloud management system;
   intercepting network traffic from said clients to said application infrastructure within said first network by said cloud management system;
   changing said application infrastructure by said node management system based on said gathered application performance metrics and said application infrastructure metrics; and
   directing network traffic targeted to access said application to server nodes of the changed application infrastructure by said traffic management system.

2. The method of claim 1, wherein said application infrastructure comprises a cloud computing environment.

3. The method of claim 1, wherein said application infrastructure comprises virtual machines.

4. The method of claim 1, wherein said application infrastructure comprises virtual machines and physical server machines.

5. The method of claim 1, wherein said application infrastructure comprises server nodes running in different geographic locations.

6. The method of claim 3, wherein said node management system is configured to start, stop and manage virtual machine instances.

7. The method of claim 1, wherein said application infrastructure metrics comprises geographic proximity of said clients to said server nodes of said application infrastructure.

8. The method of claim 1, wherein said application performance metrics comprises application load demand and application performance data.

9. The method of claim 1, wherein said traffic management system comprises a Domain Name Server (DNS) and directs network traffic targeted to access said application to server nodes of the changed application infrastructure by resolving a domain name of said application via said Domain Name Server (DNS).

10. The method of claim 1, wherein said traffic management system uses a DNS to provide IP addresses of said server nodes in said application infrastructure to said clients.

11. The method of claim 1, wherein said traffic management system performs load balancing among said server nodes in said application infrastructure.

12. The method of claim 1, wherein said traffic management system selects one or more optimal server nodes among said server nodes in said application infrastructure for serving client requests.

13. The method of claim 1, wherein said traffic management system selects one or more servers nodes among said server nodes in said application infrastructure based on geographic proximity of said server nodes to said clients.

14. The method of claim 1, wherein said traffic management system selects one or more server nodes among said server nodes in said application infrastructure based on optimized network performance to certain clients.

15. The method of claim 1, wherein said traffic management system selects a persistent server node among said server nodes in said application infrastructure for serving requests from the same client.

16. The method of claim 1, wherein said node management system changes said application infrastructure capacity in response to said application infrastructure metrics.

17. The method of claim 1, wherein said node management system changes said application infrastructure capacity in response to a certain policy.

18. The method of claim 1, wherein said node management system changes said application infrastructure capacity in response to instructions received from a third party.

19. The method of claim 1, wherein said node management system changes said application infrastructure capacity by launching new server nodes in said application infrastructure.

20. The method of claim 1, wherein said node management system changes said application infrastructure capacity by shutting down sever nodes in said application infrastructure.

21. The method of claim 1, wherein said data used in the cloud management system comprise Virtual Machine Image artifacts, configuration data, routing policy data and node management policy data.

22. A system for auto-scaling the infrastructure capacity of an application in response to client demands, comprising:
   an application configured to run on an application infrastructure comprising a plurality of server nodes and to be accessed by clients via a first network;
   a cloud management system comprising a traffic management system (TMS), a node management system, a node monitoring system and a data depository,
   wherein said traffic management system directs traffic from said clients to said server nodes of the application infrastructure;
   wherein said node monitoring system gathers performance metrics of said application and metrics of the application infrastructure;
   wherein said node management system controls and changes said application infrastructure based on said gathered application performance metrics and said application infrastructure metrics;
   wherein said data depository comprises data used in the cloud management system;
   wherein said cloud management system intercepts network traffic from said clients to said application infrastructure within said first network;
   wherein said node management system changes said application infrastructure based on said gathered application performance metrics and said application infrastructure metrics; and wherein said traffic management system directs network traffic targeted to access said application to server nodes of the changed application infrastructure.

23. The system of claim 22, wherein said application infrastructure comprises a cloud computing environment.

24. The system of claim 22, wherein said application infrastructure comprises virtual machines.

25. The system of claim 24, wherein said node management system is configured to start, stop and manage virtual machine instances.

26. The system of claim 22, wherein said application infrastructure comprises virtual machines and physical server machines.

27. The system of claim 22, wherein said application infrastructure comprises server nodes running in different geographic locations.

28. The system of claim 22, wherein said application infrastructure metrics comprises geographic proximity of said clients to said server nodes of said application infrastructure.

29. The system of claim 22, wherein said application performance metrics comprises application load demand and application performance data.

30. The system of claim 22, wherein said traffic management system comprises a Domain Name Server (DNS) and directs network traffic targeted to access said application to server nodes of the changes application infrastructure by resolving a domain name of said application via said Domain Name Server (DNS).

31. The system of claim 22, wherein said traffic management system uses a Domain Name Server (DNS) to provide IP addresses of said server nodes in said application infrastructure to said clients.

32. The system of claim 22, wherein said traffic management system performs load balancing among said server nodes in said application infrastructure.

33. The system of claim 22, wherein said traffic management system selects one or more optimal server nodes among said server nodes in said application infrastructure for serving client requests.

34. The system of claim 22, wherein said traffic management system selects one or more servers nodes among said server nodes in said application infrastructure based on geographic proximity of said server nodes to said clients.

35. The system of claim 22, wherein said traffic management system selects one or more server nodes among said server nodes in said application infrastructure based on optimized network performance to certain clients.

36. The system of claim 22, wherein said traffic management system selects a persistent server node among said server nodes in said application infrastructure for serving requests from the same client.

37. The system of claim 22, wherein said node management system changes said application infrastructure capacity in response to said application infrastructure metrics.

38. The system of claim 22, wherein said node management system changes said application infrastructure capacity in response to a certain policy.

39. The system of claim 22, wherein said node management system changes said application infrastructure capacity in response to instructions received from a third party.

40. The system of claim 22, wherein said node management system changes said application infrastructure capacity by launching new server nodes in said application infrastructure.

41. The system of claim 22, wherein said node management system changes said application infrastructure capacity by shutting down sever nodes in said application infrastructure.

42. The system of claim 22 further comprising a configuration management system and wherein said configuration management system comprises one of a user interface or an application programming interface (API).

43. The system of claim 22, wherein said data used in the cloud management system comprise Virtual Machine Image artifacts, configuration data, routing policy data and node management policy data.

* * * * *